US007842226B2

(12) United States Patent  
Polk, Jr. et al.

(10) Patent No.: US 7,842,226 B2
(45) Date of Patent: Nov. 30, 2010

(54) METHOD OF PREPARING A MOLDED ARTICLE

(75) Inventors: Dale E. Polk, Jr., Titusville, FL (US); Victor Wolynski, Cocoa, FL (US)

(73) Assignee: LRM Industries International, Inc., Rockledge, FL (US)

( * ) Notice: Subject to any disclaimer, the term of this patent is extended or adjusted under 35 U.S.C. 154(b) by 150 days.

(21) Appl. No.: 12/187,604

(22) Filed: Aug. 7, 2008

(65) Prior Publication Data

US 2009/0065981 A1 Mar. 12, 2009

Related U.S. Application Data

(60) Provisional application No. 60/970,544, filed on Sep. 7, 2007.

(51) Int. Cl.
*B29C 51/10* (2006.01)
*B29C 51/18* (2006.01)

(52) U.S. Cl. ........................... 264/554; 425/388
(58) Field of Classification Search ............ None
See application file for complete search history.

(56) References Cited

U.S. PATENT DOCUMENTS

| | | | |
|---|---|---|---|
| 3,019,488 A * | 2/1962 | Cooper et al. ........... 264/554 |
| 3,676,537 A | 7/1972 | Winstead | |
| 3,931,383 A | 1/1976 | Erlewine et al. | |
| 4,039,609 A | 8/1977 | Thiel et al. | |
| 4,061,706 A | 12/1977 | Duffield et al. | |
| 4,421,712 A | 12/1983 | Winstead | |
| 4,555,377 A | 11/1985 | Whiteside et al. | |
| 4,722,820 A | 2/1988 | Flecknoe-Brown | |
| 4,941,212 A * | 7/1990 | Liff .......................... 2/206 |

(Continued)

FOREIGN PATENT DOCUMENTS

GB 1166893 10/1969

*Primary Examiner*—Edmund H. Lee
(74) *Attorney, Agent, or Firm*—Michael A. Ervin; M. A. Ervin & Associates

(57) ABSTRACT

The method includes providing a mold apparatus (1) that includes a first mold portion (11) having a contoured and perforated interior mold surface (14), and a perimeter edge (17). The mold apparatus also includes a frame (35) that surrounds at least a portion of the perimeter edge (17) of the first mold portion (11). At least one sheet retainer (148) resides on the upper surface (38) of the frame (35). Each sheet retainer (148) includes a clamp portion (151) that faces towards (or in the direction of) the perimeter edge (17) of the first mold portion (11), and which includes a reversibly closeable clamp member (154) which defines in part a clamp interior (157). Each sheet retainer (148) is independently, reversibly and laterally attached to the upper surface (38) of the frame (35), such that each clamp portion (151) is reversibly and laterally positionable relative to the perimeter edge (17) of the first mold portion (11). In the method of the present invention, each sheet retainer, with a first portion (304) of a heated thermoplastic sheet (292) retained within the clamp portion thereof, is independently, reversibly and laterally moved towards and/or away from the perimeter edge of the first mold portion. Independent reversible and lateral positioning of each sheet retainer provides control (e.g., localized control) over the thickness of the heated thermoplastic sheet that is contacted with the interior mold surface of the first mold portion during the molding process.

22 Claims, 17 Drawing Sheets

U.S. PATENT DOCUMENTS

| | | | |
|---|---|---|---|
| 5,106,567 A | 4/1992 | Demerest | |
| 5,283,029 A | 2/1994 | Ellemor | |
| 5,314,325 A | 5/1994 | Bosler | |
| 5,783,229 A | 7/1998 | Manlove | |
| 5,980,231 A * | 11/1999 | Arends et al. | 425/397 |
| 6,086,800 A | 7/2000 | Manlove | |
| 6,719,551 B2 | 4/2004 | Polk, Jr. | |
| 6,814,905 B1 | 11/2004 | Dalgewicz et al. | |
| 6,869,558 B2 | 3/2005 | Polk, Jr. et al. | |
| 6,900,547 B2 | 5/2005 | Polk, Jr. et al. | |
| 7,008,213 B2 | 3/2006 | King | |
| 7,208,219 B2 | 4/2007 | Polk, Jr. et al. | |
| 2005/0040569 A1 | 2/2005 | Fitzell, Jr. | |
| 2005/0045466 A1 | 3/2005 | Bitterly et al. | |
| 2008/0258329 A1* | 10/2008 | Polk et al. | 264/101 |
| 2008/0258354 A1* | 10/2008 | Polk et al. | 264/503 |

* cited by examiner

METHOD OF PREPARING A MOLDED ARTICLE

CROSS REFERENCE TO RELATED PATENT APPLICATION

The present non-provisional patent application is entitled to and claims, under 35 U.S.C. §119(e), the benefit of U.S. Provisional Patent Application Ser. No. 60/970,544, filed Sep. 7, 2007, which is hereby incorporated herein by reference in its entirety.

FIELD OF THE INVENTION

The present invention relates to a method of preparing a molded article, and more particularly to a method of forming a shaped thermoplastic sheet. The method involves the use of a mold apparatus that includes at least one sheet retainer, each of which is independently, reversibly and laterally positionable relative to the perimeter edge of a first mold portion. Independent reversible and lateral positioning of each sheet retainer provides control (e.g., localized control) over the thickness of a heated thermoplastic sheet that is contacted with the interior mold surface of the first mold portion during the molding process, and accordingly control over the thickness of various portions of the final molded article.

BACKGROUND OF THE INVENTION

Single sheet thermoforming processes typically involve providing a preformed sheet of thermoplastic material (usually on a roll), heating the preformed thermoplastic sheet to a thermoformable temperature, and contacting the heated thermoplastic sheet with a shaped mold surface. The heated thermoplastic sheet is typically drawn into contact with the shaped mold surface by means of a vacuum being drawn through perforations in the mold surface.

Such prior art methods of single sheet thermoforming typically and undesirably involve multiple steps, such as separately forming the thermoplastic sheet, collecting the preformed thermoplastic sheet on a roll, transporting (e.g., shipping) the roll of preformed thermoplastic sheet to a molder (or fabricator), and re-heating the performed thermoplastic sheet prior to the thermoforming operation. In addition, such prior art methods of single sheet thermoforming also typically do not provide sufficient control of the thermoplastic sheet thickness over contoured (e.g., recessed) mold surfaces. For example, the molded thermoplastic sheet may be too thin (e.g., in deep drawn areas), and/or too thick in other areas. Such variability in molded sheet thickness may result in the final molded article having undesirably variable physical properties, such as crack failure, and aesthetic properties, such as an uneven visual appearance (e.g., irregular color).

Thermoforming processes that involve the continuous extrusion of a thermoplastic sheet, that is thermoformed using residual heat from the extruded thermoplastic sheet are known. See, for example, U.S. Pat. Nos. 6,814,905 B1, 6,086, 800 and 4,061,706. Such continuous thermoforming methods, while perhaps addressing or eliminating some of the multiple steps involved with the use of preformed thermoplastic sheets, typically and undesirably do not provide sufficient control of the thermoplastic sheet thickness over contoured (e.g., recessed) mold surfaces.

U.S. Pat. No. 4,555,377 discloses an indexed thermoforming machine having a cold sheet loading station, sheet heating stations, a molding station, and a clamp frame carrier assembly. The clamp frame carrier assembly of the '377 patent is described as including pivotally operated clamps that control sag in a clamped thermoplastic sheet after it is heated and before it is molded.

It would be desirable to develop new thermoforming processes, and apparatuses used therewith, that minimize or eliminate the steps typically encountered with prior art methods. In addition, it would be further desirable that such newly developed methods and apparatuses also provide improved control of the thickness of the molded thermoplastic sheet as it is formed and molded over contoured mold surfaces.

SUMMARY OF THE INVENTION

In accordance with the present invention, there is provided a method of preparing a molded article comprising:
(a) providing a mold apparatus comprising,
  (i) a first mold portion having an interior mold surface, and a perimeter edge, said interior mold surface having a contour and a plurality of perforations,
  (ii) a frame surrounding at least a portion of said perimeter edge of said first mold portion, said frame having an upper surface, said first mold portion and said frame being reversibly vertically positionable relative to each other, and
  (iii) at least one sheet retainer, each sheet retainer having a clamp portion facing towards (or in the direction of) said perimeter edge of said first mold portion and comprising a clamp member and a clamp interior, said clamp member being reversibly closeable, said clamp interior being defined in part by said clamp member, each sheet retainer being independently, reversibly and laterally attached to said upper surface of said frame such that said clamp portion of each sheet retainer is reversibly and laterally positionable relative to said perimeter edge;
(b) positioning said first mold portion and said frame relative to each other such that the upper surface of said frame is located above said perimeter edge;
(c) positioning said clamp member of each sheet retainer in an open position so as to provide access to said clamp interior;
(d) forming, from at least one thermoplastic composition, a heated thermoplastic sheet having a temperature that allows said heated thermoplastic sheet to be thermoformable, said heated thermoplastic sheet having a first surface and a second surface;
(e) contacting a first portion of said second surface of said heated thermoplastic sheet with the clamp interior of at least one sheet retainer;
(f) positioning said clamp member of said sheet retainer in a closed position so as to clamp and retain said first portion of said heated thermoplastic sheet within said clamp interior;
(g) positioning said first mold portion and said frame relative to each other so as to contact a second portion of the second surface of said heated thermoplastic sheet with at least a portion of the interior mold surface of said first mold portion;
(h) moving laterally at least one sheet retainer to a lateral position selected from the group consisting of towards said perimeter edge, away from said perimeter edge, and combinations thereof,
  wherein lateral movement of said sheet retainer controls at least a portion of a thickness of said second portion of said heated thermoplastic sheet that is contacted with the interior mold surface of said first mold portion;
(i) drawing reduced pressure through said plurality of perforations of said interior mold surface of said first mold portion, such that said second portion of said second surface of said heated thermoplastic sheet substantially matches said contour of said interior mold surface of said first mold portion;

(j) cooling said heated thermoplastic sheet, thereby forming a shaped thermoplastic sheet that retains said contour of said interior mold surface of said first mold portion; and (k) removing said shaped thermoplastic sheet from said first mold portion, wherein said shaped thermoplastic sheet is said molded article.

The present invention also relates to a mold apparatus as described above, that further includes a vacuum apparatus that is in fluid communication with the first mold portion. The vacuum apparatus controllably draws reduced pressure through the plurality of perforations of the interior mold surface of the first mold portion.

A fluid management structure (e.g., a storm/waste water chamber) prepared using the method of the present invention is also provided, wherein the fluid management structure comprises:

a housing having a longitudinal axis, an arch shaped cross section, a first base side flange, a second base side flange, a plurality of raised lateral ribs extending from said first base flange to said second base side flange, a plurality of continuous lateral indentations extending from said first base flange to said second base flange, each continuous lateral indentation being interposed between a pair of neighboring raised lateral ribs, an open bottom, an exterior surface, and an interior surface;

a first endplate having an exterior surface and an interior surface; and a second endplate having an exterior surface and an interior surface, wherein said housing, said first endplate and said second endplate together defining a continuous unitary structure, said exterior surface of said housing, said exterior surface of said first endplate and said exterior surface of said second endplate are each defined by said first surface of said heated thermoplastic sheet (and correspondingly the first surface of the shaped thermoplastic sheet/molded article prepared therefrom), said interior surface of said housing, said interior surface of said first endplate and said interior surface of said second endplate are each defined by said second surface of said heated thermoplastic sheet (and correspondingly the second surface of the shaped thermoplastic sheet/molded article prepared therefrom), said interior surface of said housing, said interior surface of said first endplate and said interior surface of said second endplate together defining an interior chamber, said first endplate having a first opening that is in fluid communication with said interior chamber, said second endplate having a second opening that is in fluid communication with said interior chamber, and further wherein, said housing has a housing wall thickness, said first endplate has a first endplate wall thickness, and said second endplate has a second endplate wall thickness, said housing wall thickness, said first endplate wall thickness and said second endplate wall thickness being substantially equivalent. The fluid management structure being the shaped thermoplastic sheet/molded article prepared by the method of the present invention.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred (though non-limiting) embodiments of the invention are illustrated and described.

As used herein and in the claims, terms of orientation and position, such as, "upper", "lower", "inner", "outer", "right", "left", "vertical", "horizontal", "top", "bottom", and similar terms, are used to describe the invention as oriented and depicted in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about".

BRIEF DESCRIPTION OF THE DRAWINGS

In FIGS. 1 through 17, like reference numerals designate the same components and structural features, unless otherwise indicated.

DETAILED DESCRIPTION OF THE INVENTION

Figure 1:
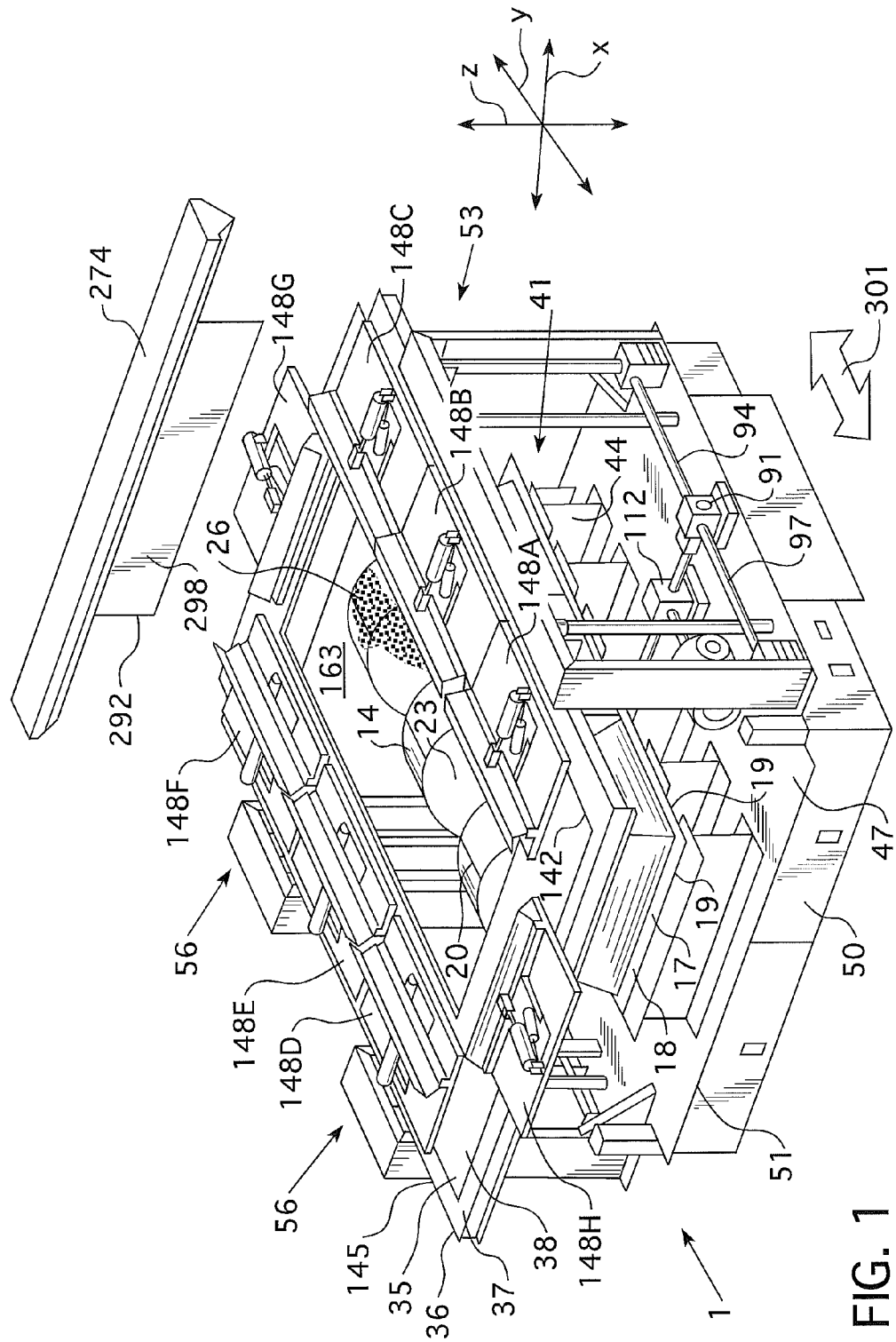
FIG. 1 is a representative perspective view of a sheet molding apparatus according to the present invention, with a heated thermoplastic sheet emerging from the sheet die.
Figure 2:
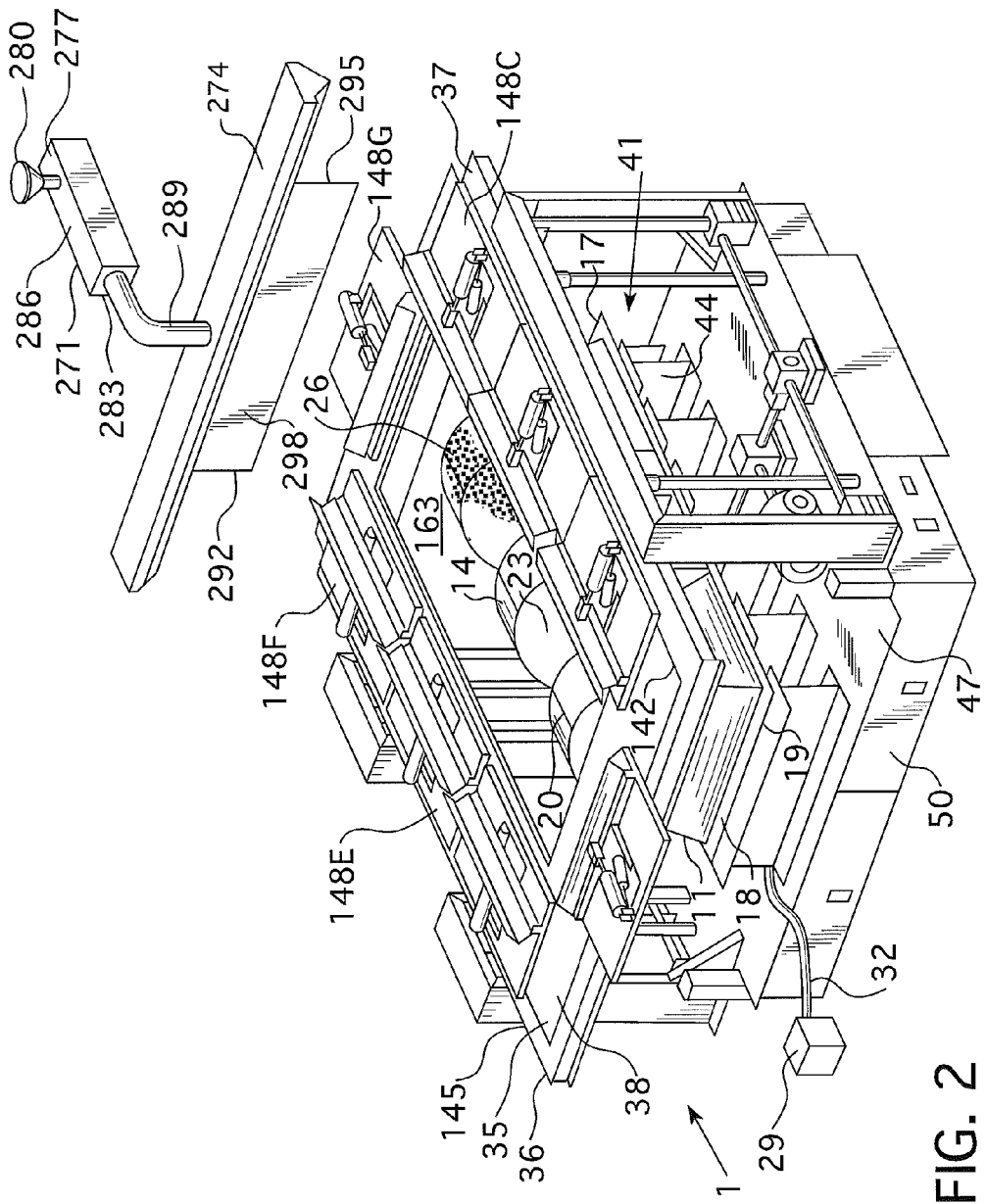
FIG. 2 is a representative perspective view of the sheet molding apparatus of FIG. 1, further including an extruder and a separate vacuum pump for the first mold portion.

With reference to FIGS. 1 and 2, the method of the present invention involves providing a mold apparatus 1, and more particularly a sheet molding apparatus 1, that includes a first mold portion 11 having an interior mold surface 14 and a perimeter edge 17. Interior mold surface 14 has a contour and a plurality of perforations 26. The contour of interior mold surface 14 may include, for example, raised portions 20 and/or recessed portions 23. Interior mold surface 14 may be a substantially recessed or female interior mold surface (not shown), in which case, it resides substantially below perimeter edge 17. Alternatively, interior mold surface 14 may be a substantially raised or male interior mold surface (as depicted), in which case, a majority of interior mold surface 14 resides above perimeter edge 17. In addition, interior mold surface 14 may include relatively shallow (e.g., relative to raised portions 20 and recessed portions 23) raised and/or recessed patterns (not shown), such as grooves, for purposes of providing the surface of the molded article with texture and/or molded-in indicia.

Perimeter edge 17 typically defines the terminal extent of first mold portion 11 beyond which heated thermoplastic sheet, if any, extending there-beyond does not form a portion of the final molded article. Typically, thermoplastic sheet, if any, extending beyond perimeter edge 17 is removed (e.g., cut away) from the final molded article. Perimeter edge 17 may have any suitable shape, such as rounded, polygonal, irregular or combinations thereof. As depicted in the drawings, perimeter edge 17 is in the form of a substantially horizontal shelf having an upper surface 18 and a terminal edge 19.

For purposes of clarity, the plurality of perforations 26 are only depicted in FIGS. 1 and 2, and only over a portion of interior mold surface 14. Perforations 26 may be located over substantially the entirety of interior mold surface 14 or in zones (or clusters). Perforations 26 may be arranged substantially uniformly or non-uniformly (e.g., randomly) over interior mold surface 14. If located in zones, portions of interior mold surface 14 may be free of perforations. The plurality of perforations are typically arranged (or located) uniformly over substantially the entirety of interior mold surface 14.

The plurality of perforations are in fluid communication with at least one vacuum apparatus, such as a vacuum pump. Typically, first mold portion 11 has at least one interior chamber (not shown) that is in fluid communication with the plurality of perforations 26 and at least one vacuum apparatus, for example vacuum apparatus 29 by means of conduit 32, as depicted in FIG. 2. Conduit 32 may be a rigid conduit, but more typically is fabricated from a flexible material that may be reversibly coiled. Conduit 32 is depicted as passing beneath a portion of a structure 41 upon which first mold portion 11 rests and is supported. Support structure 41 includes a plurality of beams 44 (e.g., I-beams) that extend upwardly from the upper surface 47 of an underlying platform 50.

While depicted as being separated from first mold portion 11, vacuum apparatus 29 may alternatively be positioned more proximate thereto (e.g., residing on platform 50, not so depicted). Vacuum apparatus 29 controllably draws reduced pressure through the plurality of perforations in interior mold surface 14. For example, the reduced pressure drawn through perforations 26 may be ramped in stages with at least one pressure plateau, or the reduced pressure may be drawn at the full capacity of vacuum apparatus 29 from the instant it is turned on (or activated).

To assist removing the molded article from first mold portion 11, a gas (e.g., air) may be passed out of perforations 26 at elevated pressure (i.e., at a pressure greater than ambient atmospheric pressure). To pass a gas, such as air, at elevated pressure out through perforations 26, vacuum apparatus 29 may be operated in reverse, and/or a separate pressure pump (not shown) may be used in fluid communication with the internal chamber and correspondingly perforations 26 of first mold portion 11. In addition, the gas passed out of perforations 26 may be cooled to a temperature less than ambient temperature (e.g., a temperature less than 25° C., such as 5° C. to 15° C.) to further assist cooling the heated thermoplastic sheet, such that it retains the contour shape of interior mold surface 14.

The plurality of perforations in interior mold surface 14 may have any suitable shape and dimension, provided they: (i) are not fouled, occluded or otherwise clogged with thermoplastic material when the molded article is removed from first mold portion 11; and (ii) do not result in undesirable surface features or defects on the final molded article (e.g., plastic nubs extending from a surface thereof). The perforations in interior mold surface 14 may have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations of interior mold surface 14 have substantially circular cross-sectional shapes having diameters of from 0.1 mm to 7 mm, more typically from 0.5 mm to 5 mm, and further typically from 1 mm to 3 mm. In an embodiment of the present invention, the perforations of interior mold surface 14 have substantially circular cross-sectional shapes having diameters of 1.6 mm (1/16 inch).

The sheet molding apparatus of the present invention also includes a frame 35 that surrounds at least a portion of perimeter edge 17 of first mold portion 11. Frame 35 has an upper surface 38, and includes an opening 163 that is dimensioned to allow first mold portion 11 and, in particular, perimeter edge 17 thereof to pass at least partially there-through. Frame 35 and first mold portion 11 are reversibly vertically positionable relative to each other (e.g., along the z-axis as depicted in FIG. 1), which allows for a heated thermoplastic sheet to be brought into contact with interior mold surface 14 of first mold portion 11, as will be discussed in further detail herein. For example, first mold portion 11 and frame 35 may each independently be reversibly vertically positionable by art-recognized means, such as by pistons, scissor jacks, and/or screw jacks.

Frame 35 may be used alone. Alternatively, frame 35 may be used in conjunction with a frame support 36, which resides abuttingly beneath and provides support for frame 35. The use of a separate frame 35 and a support frame 36 is advantageous as it allows for separate frames having, for example, different sheet retainers and/or different sheet retainer configurations, to be quickly interchanged (e.g., on and off of support frame 36). Being able to quickly interchange frames with associated sheet retainers thereon, may be desirable when the mold apparatus is fitted with different first mold portions having different dimensions and/or configurations. Upper surface 38 of frame 35 resides above upper surface 37 of support frame 36. Frame 35 has an outer edge 142. Frame 35 is typically dimensioned such that its outer edge 142 is inward relative to the outer edge 145 of support frame 36. Such dimensioning, allows for each sheet retainer 148 to be laterally moveable over (e.g., slidingly over) upper surface 38 of frame 35, and at the same time a rear portion 204 thereof to be laterally moveable over and separated from upper surface 37 of support frame 36, as will be discussed in further detail herein.

In an embodiment of the present invention, first mold portion 11 is substantially stationary relative to vertical positioning, and frame 35 is reversibly and controllably vertically positionable. In a particular embodiment, frame 35 is reversibly vertically positionable by means of a first screw actuator assembly 53 and a second screw actuator assembly 56, which are located on opposite sides of the frame. The screw actuator assemblies (e.g., 53 and 56) are typically positioned so as to minimize the likelihood that they will come into direct contact with the heated thermoplastic sheet as it is laid down across the sheet retainers, as will be discussed in further detail herein.

Figure 3:
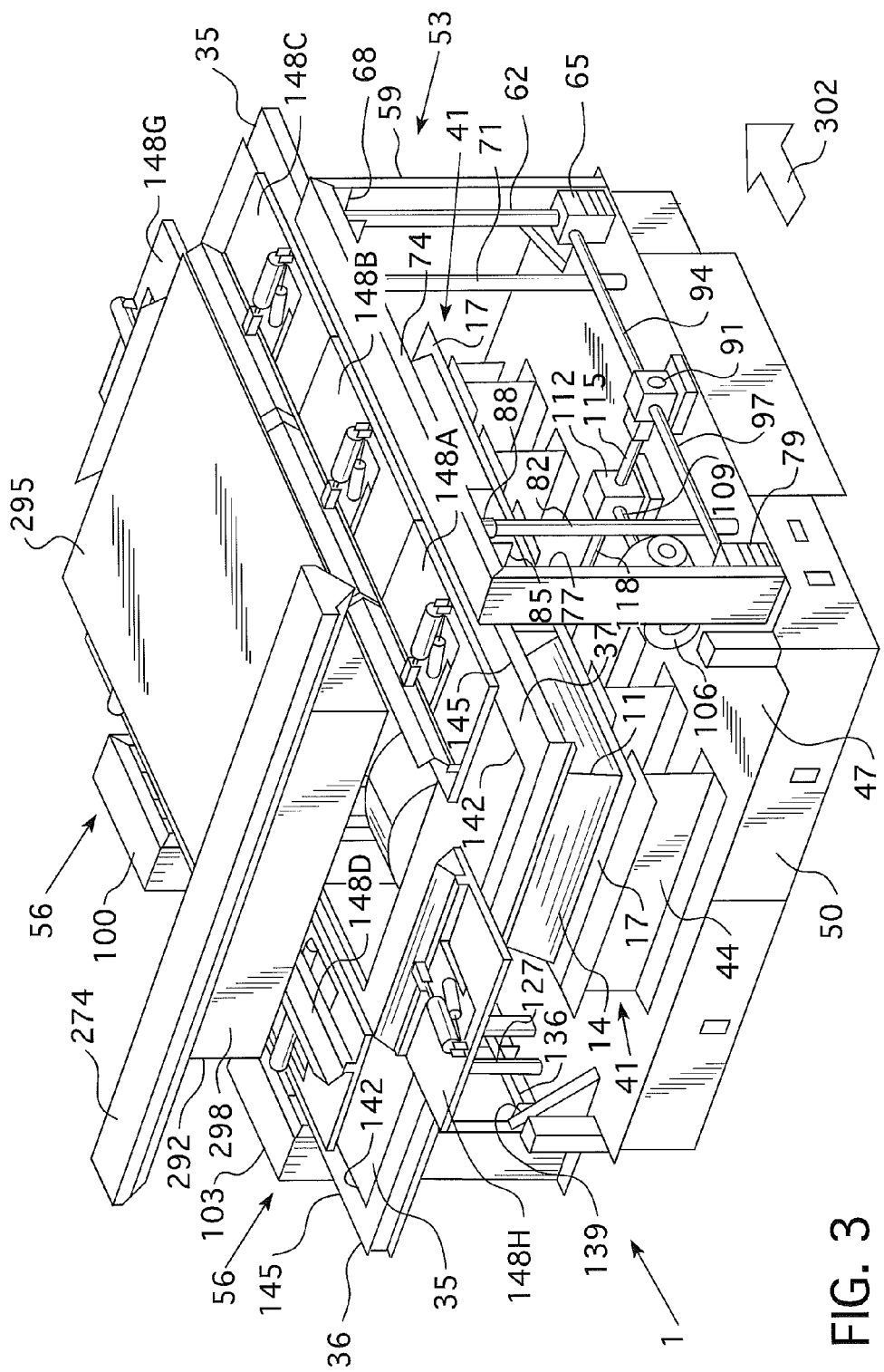
FIG. 3 is a representative perspective view of the sheet molding apparatus of FIG. 1, in which the heated thermoplastic sheet extends across a portion of the sheet retainers and over a portion of the first mold portion.

With reference to FIG. 3, screw actuator assembly 53 includes a box frame 59 that is attached to and extends upwardly from upper surface 47 of platform 50. First screw actuator assembly 53 further includes a first screw 62 that extends vertically upwardly from a first screw transfer gear box 65, and a first guide rod 71 that extends vertically upward from upper surface 47 of platform 50. First screw 62 engages threadingly with a first threaded eyelet 68 that extends laterally outward from support frame 36. First guide rod 71 is not threaded and engages slidingly with a first non-threaded guide eyelet 74 that extends laterally outward from support frame 36. First actuator assembly 53 also includes a second screw 77 (only partially visible in the drawing figures) that extends vertically upward from a second screw transfer gear box 79, and a second guide rod 82 that extends vertically upward from upper surface 47 of platform 50. Second screw 77 engages threadingly with a second threaded eyelet 85 that extends laterally outward from support frame 36. Second guide rod 82 is not threaded and engages slidingly with a second non-threaded guide eyelet 88 that extends laterally outward from support frame 36.

First screw actuator assembly 53 also includes a primary transfer gear box 91. Primary transfer gear box 91 has a first lateral shaft 94 that extends laterally outward therefrom and engages with first screw transfer gear box 65, and a second lateral shaft 97 that extends laterally outward therefrom and engages with second screw transfer gear box 79.

Figure 5:
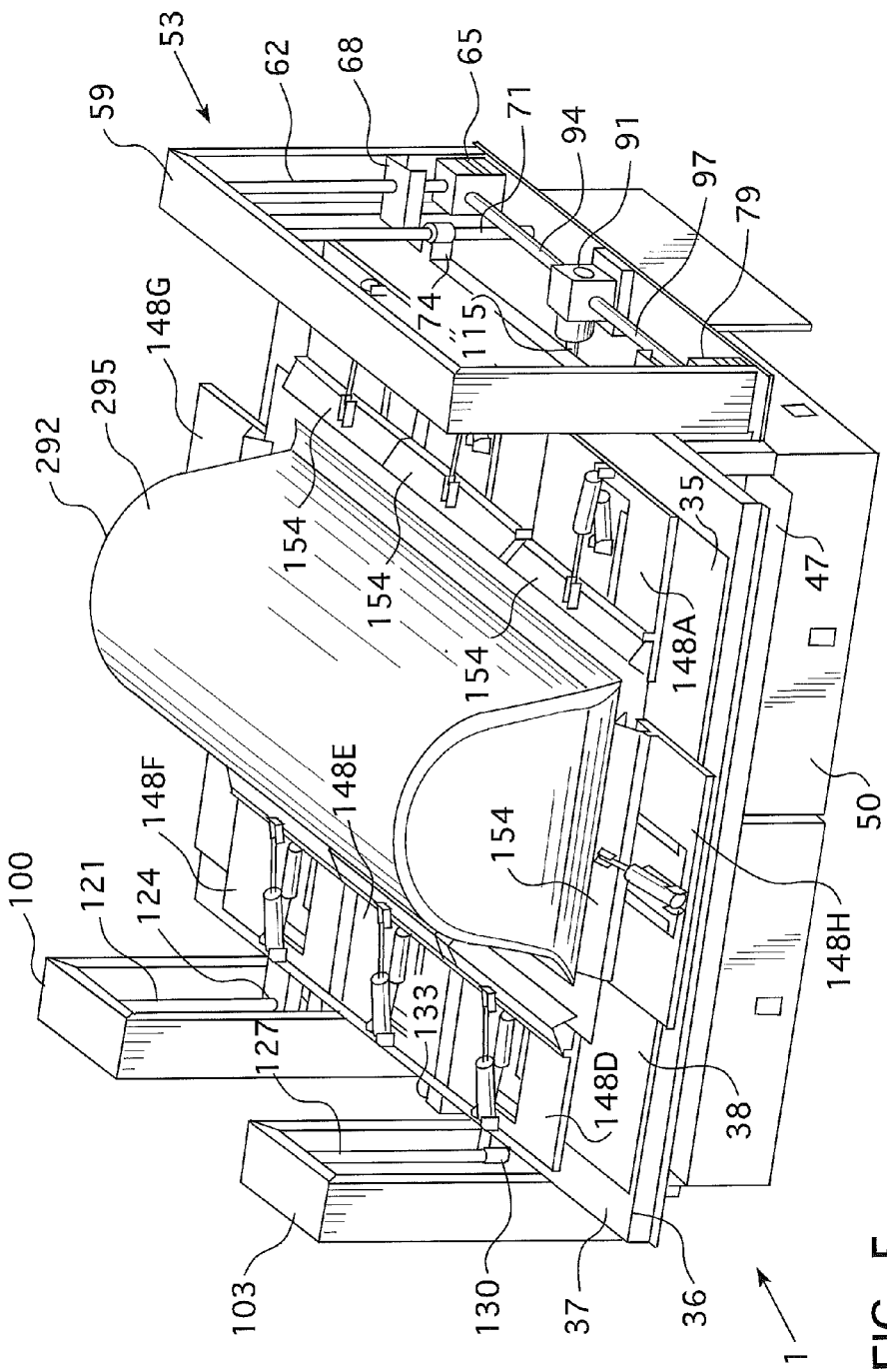
FIG. 5 is a representative perspective view of the sheet molding apparatus of FIG. 4, in which the frame has been moved vertically downward with the heated thermoplastic sheet retained within the clamp portions of each sheet retainer.
Figure 15:
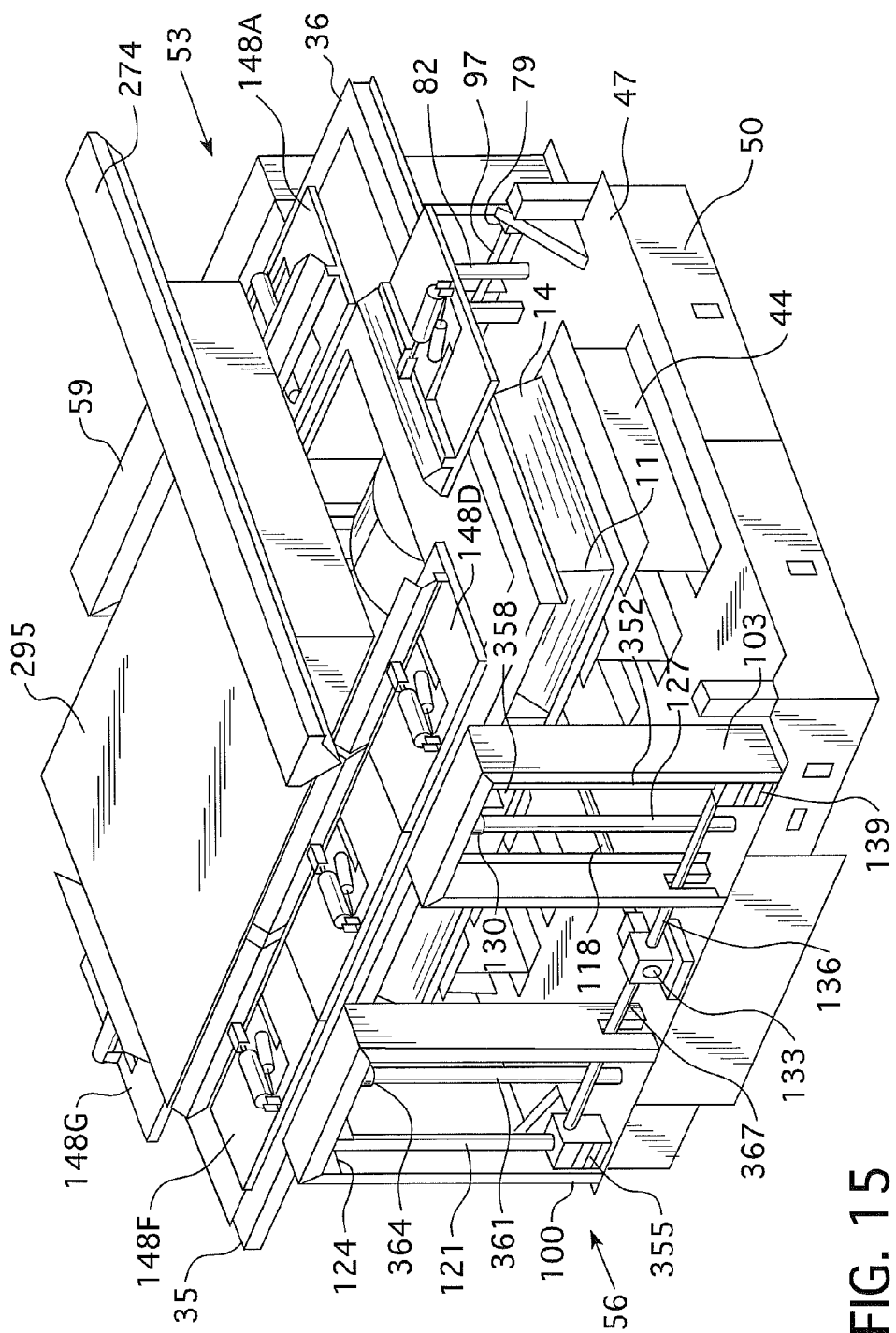
FIG. 15 is a representative alternate perspective view of the sheet molding apparatus of FIG. 3, which provides a perspective view of the second screw actuator assembly (56)

Second screw actuator assembly 56 is substantially the same as first screw actuator assembly 53. With reference to FIGS. 3, 5 and 15, second screw actuator assembly 56 includes: first 121 and second 352 screws that each extend vertically upward from respective first 355 and second 139 screw transfer gear boxes, and engage threadingly with respective first 124 and second 358 threaded eyelets; first 361 and second 127 guide rods that each extend vertically upward from the upper surface 47 of the platform 50, and engage slidingly with respective first 364 and second 130 non-threaded eyelets; and a primary transfer gear box 133 having first 367 and second 136 lateral shafts that each engage respectively with the first 355 and second 139 screw transfer gear boxes. Rather than having a single box frame (such as box frame 59 of first screw actuator assembly 53) second screw actuator assembly 56 has two separate box frames 100 and 103. Box frame 100 contains first screw 121 and first guide rod 361, and box frame 103 contains second screw 352 and second guide rod 127 of second screw actuator assembly 56.

The first and second screw actuator assemblies may each be driven independently or in concert, and may be manually or mechanically driven. Typically, the first and second screw actuator assemblies are each mechanically driven, and more typically mechanically driven in concert. Separate motors may be used to drive each screw actuator assembly. In an embodiment and with reference to FIGS. 3 and 15, the first 53 and second 56 screw actuator assemblies are driven in concert by means of a single drive motor 106. Drive motor 106 may be selected from known motors, and is typically an electric motor. Drive motor 106 has a drive shaft 109 (only partially visible in the drawings) that extends outward therefrom and engages with a global transfer gear box 112 that has a first global lateral shaft 115 that extends outward therefrom and engages with primary transfer gear box 91 of first screw actuator assembly 53. Global transfer gear box 112 has a second global lateral shaft 118 that extends outward therefrom, passes through/under support structure 41 and engages with the primary transfer gear box 133 of second screw actuator assembly 56.

When activated and engaged, drive motor 106 turns drive shaft 109, which through global transfer gear box 112 causes the first 115 and second 118 global lateral shafts to turn. First global lateral shaft 115, through primary transfer gear box 91, causes the first 94 and second 97 shafts to turn, which through first 65 and second 79 screw transfer gear boxes causes the first 62 and second 77 screws of first screw actuator assembly 53 to turn. At the same time, second global lateral shaft 118, through primary transfer gear box 133, causes the first 367 and second 136 global lateral shafts of the second screw actuator assembly 56 to turn, which correspondingly through the first 355 and second 139 screw transfer boxes thereof cause the first 121 and second 352 screws of the second screw actuator assembly 56 to turn. The screws (62 and 77; 121 and 352) engage threadingly with their respective threaded eyelets (68 and 85; 124 and 358) and thus cause frame 35 to move vertically up or down, depending, for example, on which way drive motor 106 and drive shaft 109 are turned. Further, correspondingly, the non-threaded guide rods (71 and 82; 361 and 127) engage slidingly with their respective non-threaded eyelets (74 and 88; 364 and 130) so as to stabilize the vertical movement of frame 35. As a result of the arrangement of various shafts and transfer gear boxes, the first and second screw actuator assemblies are driven controllably in concert.

The mold apparatus of the present invention also includes at least one sheet retainer 148. With reference to FIGS. 7 through 11, each sheet retainer has a clamp portion 151 that faces towards (or in the direction on perimeter edge 17 of first mold portion 11. Clamp portion 151 includes a clamp member 154 and a clamp interior 157. Clamp member 154 is reversibly closeable. Clamp interior 157 is defined in part by clamp member 154, and more particularly at least in part by interior (or under) surface 160 of clamp member 154. Clamp interior 157 may be defined by a combination of interior surface 160 of clamp member 154 and: the portion of upper surface 38 of frame 35 residing there-under; or more typically the upper surface of a forward portion of a base plate of sheet retainer 148 residing there-under, as will be discussed in further detail herein. Each sheet retainer 148 is independently, reversibly and laterally attached to the upper surface 38 of frame 35, such that clamp portion 151 is reversibly and laterally positionable relative to perimeter edge 17 of first mold portion 11.

Figure 7:
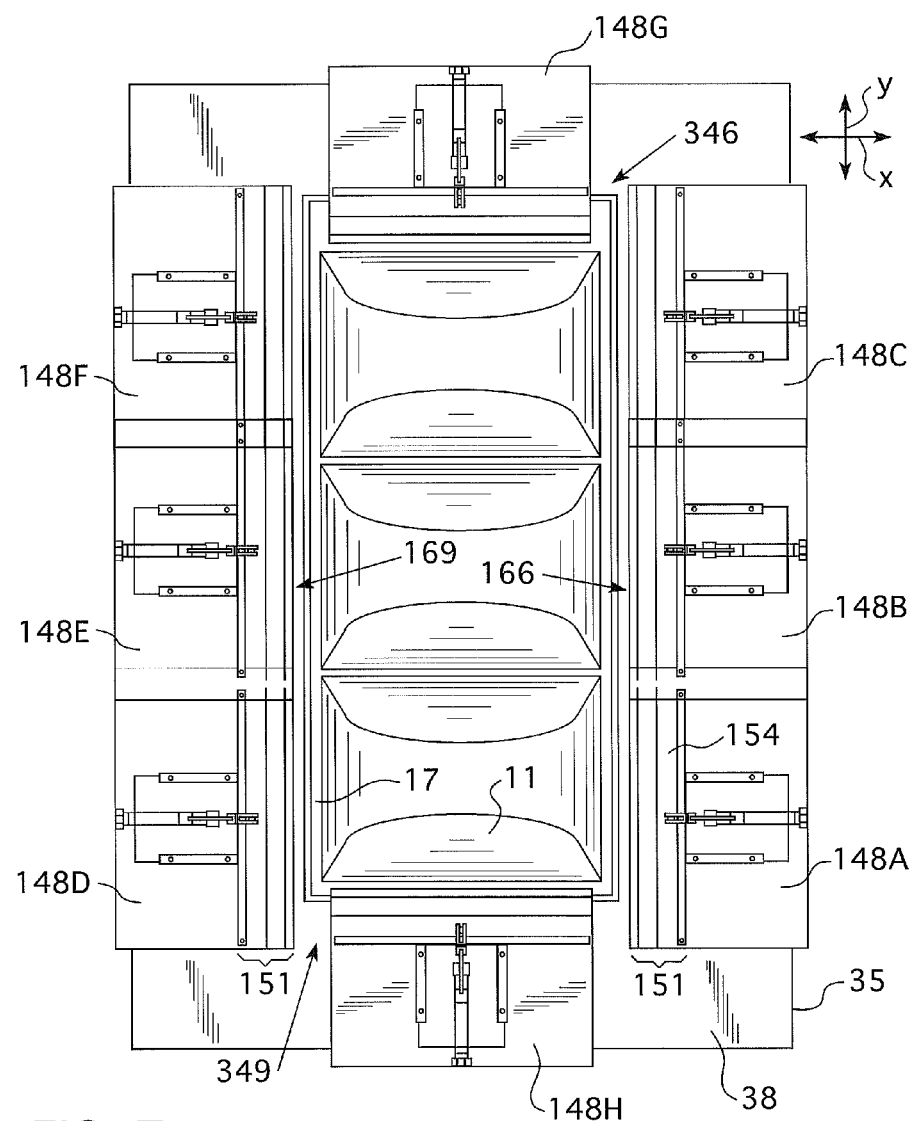
FIG. 7 is a representative top plan view of the first mold portion, frame and sheet retainers alone, with the frame positioned substantially near the bottom of its vertical drop, and showing the sheet retainers in various lateral positions.
Figure 8:
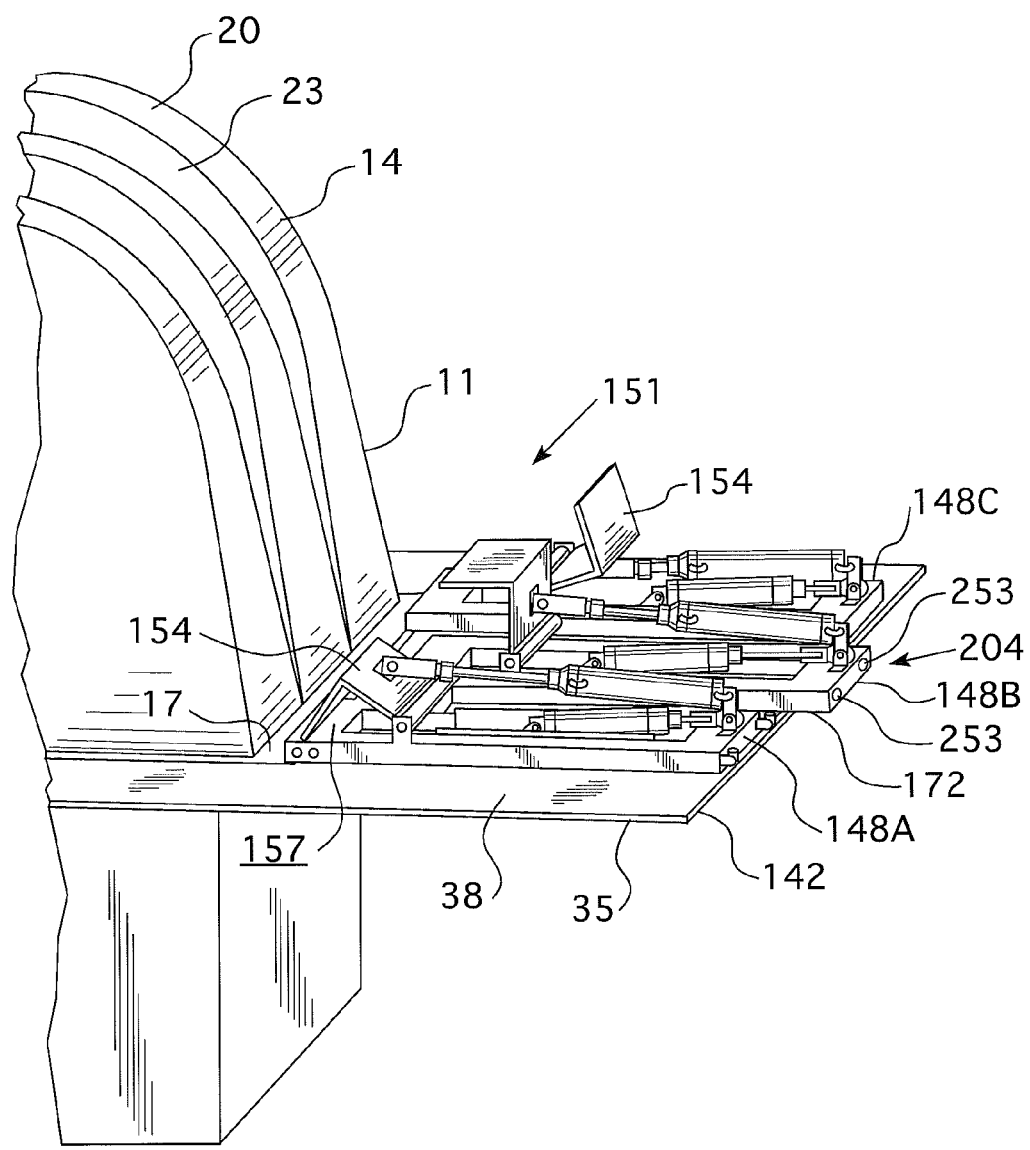
FIG. 8 is a representative partial cut-away perspective view of a first mold portion, frame and sheet retainer arrangement similar to that of FIG. 7, showing the clamp members of the sheet retainers in various stages between open and closed positions.

While the mold apparatus of the present invention includes at least one sheet retainer, it more typically includes at least two separate and independent sheet retainers (e.g., 2, 3, 4, 5, 6, 7, 8, 9, 10 or more separate and independent sheet retainers). The sheet retainers 148 may be positioned in any arrangement (e.g., symmetrically or asymmetrically) on frame 35 around opening 163, provided the clamp portion 151 of each sheet retainer faces or is oriented towards (in the direction on perimeter edge 17 of first mold portion 11. In an embodiment, the mold apparatus includes eight sheet retainers 148A, 148B, 148C, 148D, 148E, 148F, 148G and 148H. See, for example, FIG. 7. First mold portion 11 has a generally rectangular plan view shape, and the sheet retainers are arranged symmetrically along the long sides and at the ends of the first mold portion, with: sheet retainers 148A, 148B and 148C positioned along first long side 166 of first mold portion 11; sheet retainers 148D, 148E and 148F positioned along second long side 169 of first mold portion 11; sheet retainer 148G positioned at first end 346; and sheet retainer 148H positioned at second end 349 (FIG. 7). The sheet retainers along first long side 166 (148A, 148B and 148C) are located in substantially opposing symmetrical relation relative to the sheet retainers along second long side 169 (148D, 148E and 148F). The sheet retainer 148G at first end 346 is located in substantially opposing symmetrical relation relative to the sheet retainer 148H at opposite second end 349.

Sheet retainer 148 may further include a base plate 172 having an upper surface 175, a lower surface 178 and a forward portion 181. See, in particular, FIG. 10. Clamp member 154 is hingedly attached to an upper surface 183 of forward portion 181 of base plate 172. More particularly, clamp member 154 is attached to upper surface 183 by means of a hinge member 185 that engages hingedly (or rotationally) with hinge retainers 188 and 191, which are opposingly positioned on (relative to each other) and extend upwardly from upper surface 183 of forward portion 181. Clamp portion 151 of sheet retainer 148 is defined by clamp member 154 and forward portion 181 of base plate 172. The upper surface 183 of forward portion 181 of base plate 172 and inner surface 160 of clamp member 154 together define clamp interior 157.

Figure 11:
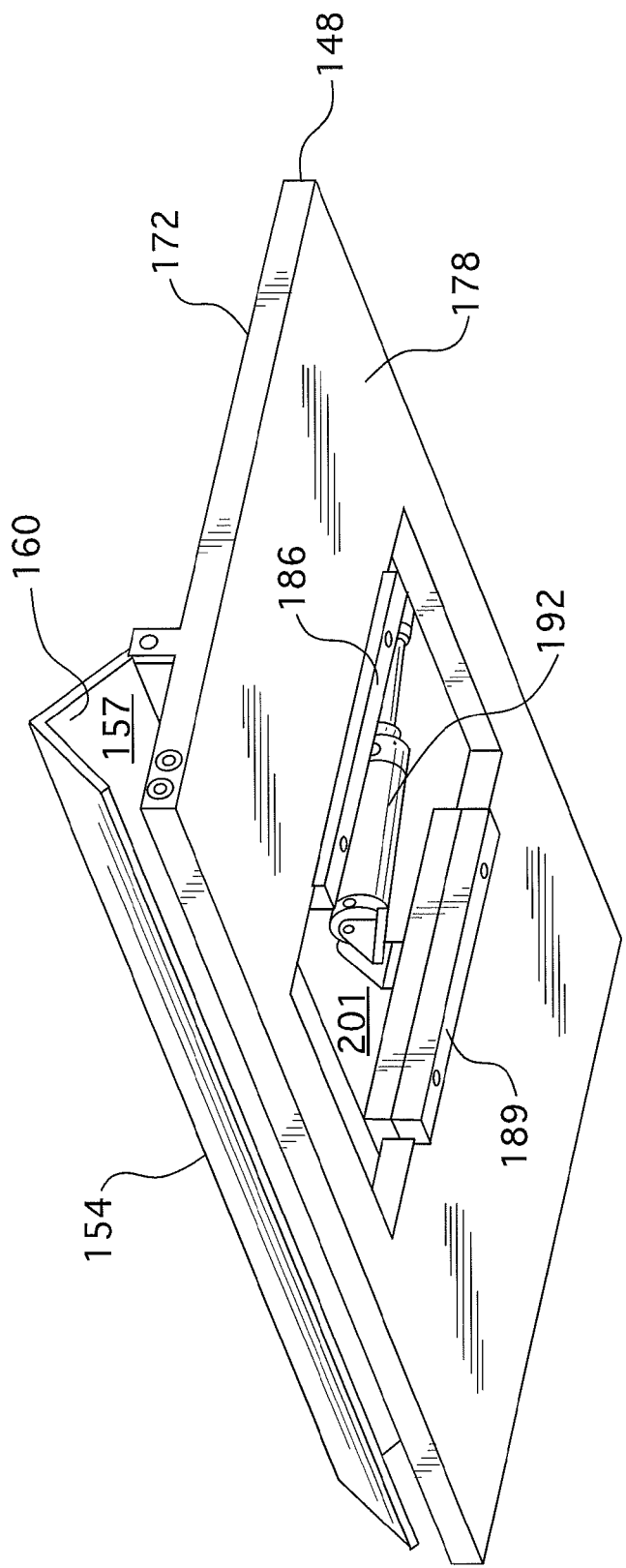
FIG. 11 is a representative perspective view towards the forward portion of the sheet retainer of FIG. 9 showing the underside of the sheet retainer.

At least a portion of lower surface 178 of base plate 172 is in sliding and abutting relationship with upper surface 38 of frame 35. In an embodiment, sheet retainer 148 further includes at least one elongated guide extending from lower surface 178 of base plate 172, which is received within a suitably dimensioned groove or slot (not shown) within upper surface 38 of frame 35. The elongated guides are oriented laterally outward from (e.g., orthogonal to) perimeter edge 17 of first mold portion 11, and provide improved control (e.g., orientation) over the reversible lateral movement of the sheet retainers with the apparatus and in the method of the present invention. With reference to FIG. 11, sheet retainer 148 has a first elongated guide 186 and a second elongated guide 189 extending outward (downward) from lower surface 178 of base plate 172, which are slidingly received within suitably dimensioned grooves or slots (not shown) within upper surface 38 of frame 35. Sliding receipt of the elongated guides (186, 189) within the grooves in upper surface 38 of frame 35, serves to maintain sheet retainer 148 in a desired orientation (e.g., clamp portion 151 facing towards perimeter edge 17 of first mold portion 11) as it is reversibly laterally repositioned in the method of the present invention.

Reversible lateral movement of each sheet retainer may be achieved manually, or more typically mechanically. Sheet retainer 148 further includes, in an embodiment and with reference to FIGS. 9 and 10, a first linear actuator 192 having a first end 195 and a second end 198. As used herein and in the claims, the term "linear actuator" means a device that is reversibly linearly expandable. Linear actuators, as used with regard to the sheet retainer, may be selected from art-recognized devices, such as linear screw actuators, hydraulic linear actuators, pneumatic linear actuators and combinations thereof. Base plate 172 of sheet retainer 148 further includes a slot (or elongated hole/aperture) 201 and a rear portion 204 having an upper surface 207.

First end 195 of first linear actuator 192 is located within slot 201 and is fixedly attached to upper surface 38 of frame 35. First end 195 of first linear actuator 192 is typically pivotally attached to a bracket 210 that is attached to upper surface 38 of frame 35. Pivotal attachment between fist end 195 and bracket 210 may be achieved by art-recognized means, such as a pin extending laterally through bracket 210 and a hole in first end 195. Second end 198 of first linear actuator 192 is fixedly attached to upper surface 207 of rear portion 204 of base plate 172. More typically, second end 198 of first linear actuator 192 is pivotally attached to a bracket 213 which extends upward from upper surface 207 of rear portion 204 of base plate 172. Pivotal attachment between second end 198 and bracket 213 may be achieved by art-recognized means, such as a pin 237 extending laterally through bracket 213 and a hole in second end 198.

First linear actuator 192, as depicted in the drawings, includes a cylinder 216 containing a piston (not visible) and a reversibly retractable arm 219 that is threadingly connected to second end 198. Reversible linear expansion of first linear actuator 192 provides reversible lateral movement of sheet retainer 148 relative to perimeter edge 17 of first mold portion 11. More particularly, as retractable arm 219 is extended, sheet retainer 148 is laterally (e.g., along the x-axis in the case of sheet retainer 148A, or along the y-axis in the case of sheet retainer 148G) moved away from perimeter edge 17 of first mold portion 11. Correspondingly, as retractable arm 219 is retracted within cylinder 216, sheet retainer 148 is laterally (e.g., along the x-axis in the case of sheet retainer 148A, or along the y-axis in the case of sheet retainer 148G) moved towards perimeter edge 17 of first mold portion 11. See, for example, FIG. 7.

Clamp member 154 of sheet retainer 148 may be manually or, more typically, mechanically reversibly closed/opened. Sheet retainer 148 further includes, in an embodiment and with further reference to FIGS. 9 and 10, a second linear actuator 222 having a first end 225 and a second end 228. As with the first linear actuator 192, second linear actuator 222 is reversibly linearly expandable, and may be selected from known linear actuators, such as linear screw actuators, hydraulic linear actuators, pneumatic linear actuators and combinations thereof.

First end 225 of second linear actuator 222 is pivotally attached to the exterior surface 231 of clamp member 154. More typically, first end 225 of second linear actuator 222 is pivotally attached to a bracket or extension 234 that extends outwardly from exterior surface 231 of clamp member 154. As depicted in the drawings, first end 225 of second linear actuator 222 is in the form of a bracket, into which extension 234 is received, and pivotal attachment there-between may be achieved by art-recognized methods, such as a pin attached to first end 225 and extending through a hole in extension 234 (not visible in the drawing figures). Second end 228 of second linear actuator 222 is attached to upper surface 207 of rear portion 204 of base plate 172. Typically, second end 228 is pivotally attached to a bracket (e.g., bracket 213) that extends upwardly from upper surface 207 of rear portion 204 of base plate 172. Pivotal attachment between second end 228 and bracket 213 may be achieved by art-recognized methods, such as a pin extending through bracket 213 and second end 228.

In an embodiment, second end 198 of first linear actuator 192 and second end 228 of second linear actuator 222 are both attached to the same bracket (e.g., bracket 213). In this particular embodiment, and as depicted in the drawings, second end 228 of second linear actuator is pivotally attached to an upper portion of bracket 213, and second end 198 of first linear actuator 192 is attached to a lower portion of bracket 213, beneath the attachment point of second end 228.

Second linear actuator 222, as depicted in the drawings, includes a cylinder 240 containing a piston (not visible) and a reversibly retractable/extendable arm 243 that is threadingly connected to first end 225. Reversible linear expansion of second linear actuator 222 provides reversible closing (and correspondingly, opening) of clamp member 154. In particular, as reversibly retractable arm 243 is extended, clamp member 154 is moved to or towards a closed position, and correspondingly as reversibly retractable arm 243 is retracted (within cylinder 240) clamp member 154 is moved to or towards an open position.

Figure 10:
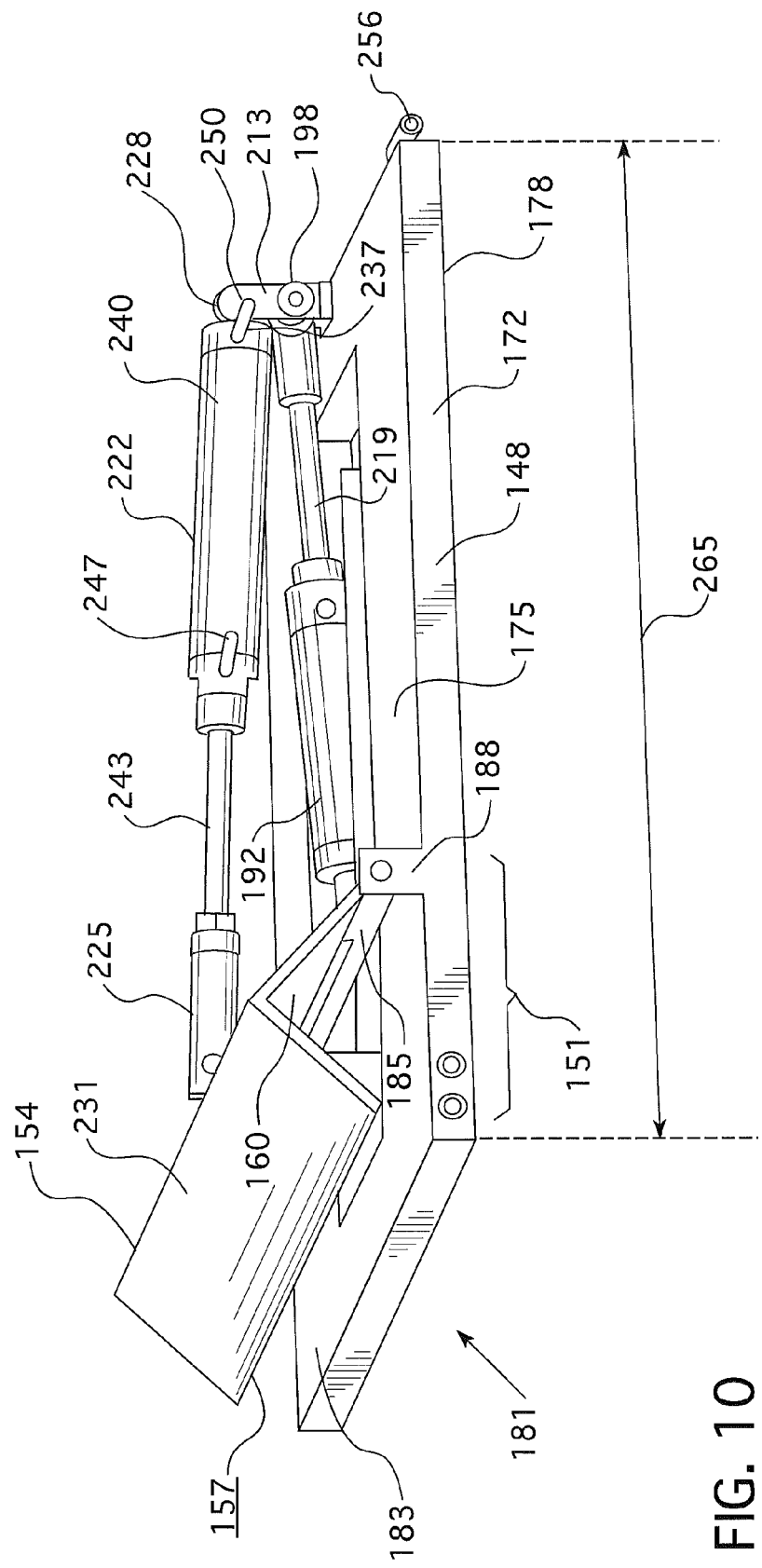
FIG. 10 is a representative perspective view towards the forward portion of the sheet retainer of FIG. 9.

In the case of hydraulic and/or pneumatically driven linear actuators, the linear actuators of the sheet retainer may be fitted with ports through which a fluid (e.g., air and/or a liquid, such as hydraulic fluid/oil) are introduced (typically, under elevated pressure) for purposes of linearly expanding and retracting the linear actuator. With reference to FIG. 10, and for purposes of illustration, second linear actuator 222 includes a first port 247 and a second port 250 through which a fluid (e.g., air and/or a liquid, such as oil) may be introduced, under elevated pressure, for purposes of linearly extending and retracting arm 243, and thereby reversibly closing and opening clamp member 154. First linear actuator 192 may be similarly fitted with such ports (not shown).

In an embodiment, and as discussed previously herein, frame 35 may reside on and be supported by an underlying frame support 36. Outer edge 142 of frame 35 is dimensioned so as to be inward relative to outer edge 145 of frame support 36. The inward positioning of outer edge 142 of frame 35 relative to outer edge 145 of frame support 36 may be selected such that reversible lateral movement of the sheet retainers results in rear portion 204 of each sheet retainer 148 moving laterally over, above and separated from upper surface 37 of support frame 36. See, for example, FIGS. 1, 7 and 8. More particularly, in this embodiment, that portion of lower surface 178 residing in (or under) rear portion 204 of base plate 172 is moved laterally over, above and separated from upper surface 37 of support frame 36. Such an arrangement may be desirable for reasons including, but not limited to, allowing lubricant to be applied to lower surface 178 of base plate 172, including for example elongated guides 186 and 189, while the sheet retainers 148 are in use (e.g., during the method of the present invention).

During the sheet molding process of the present invention, a portion of a heated thermoplastic sheet is contacted with the clamp interior 157 of the clamp portion 151 of the sheet retainer 148, as will be discussed further herein. Typically, a portion of the heated thermoplastic sheet is contacted with upper surface 183 of forward portion 181 before and after clamp member 154 is clamped down and the heated sheet thus being retained within clamp interior 157. To prevent or minimize fouling of the clamp portion 151 of the sheet retainer 148 (e.g., by molten or nearly molten thermoplastic material being retained thereon), it may be desirable to provide temperature control (e.g., cooling) to at least the forward portion 181 of sheet retainer 148. In an embodiment, base plate 172 of sheet retainer 148 is provided with at least one enclosed passage 253 which extends into forward portion 181 of base plate 172. See, for example, sheet retainer 148B of FIG. 8, in which the terminal points of enclosed passage 253 are depicted in rear portion 204 of base plate 172. The enclosed channel may extend through base plate 172, or it may be in the form of a conduit (not shown) attached to the exterior surface (e.g., upper surface 175) of base plate 172.

Enclosed passage 253 is dimensioned for the receipt and passage of a heat exchange fluid therethrough. The heat exchange fluid may be selected from those known to the skilled artisan, such as water, glycols (e.g., alkylene glycols, such as ethylene glycol, propylene glycol and/or poly-alkylene glycols), alcohols (e.g., methanol, ethanol, n-propanol and/or iso-propanol), and mixtures thereof. For example, and with reference to FIG. 9, a heat exchange fluid may be drawn from the reservoir of a heat exchanger (not shown), introduced through port 256 and removed through port 259 (and returned to the reservoir of the heat exchanger). The heat exchange fluid is typically introduced into enclosed passage 253 at a reduced temperature (e.g., a temperature less than that of the heated thermoplastic sheet, such as less than or equal to room temperature, 20° C., 15° C. or 10° C.). The heat exchange fluid passes through enclosed passage 253 into forward portion 181 (not depicted in the drawings) and serves to remove heat energy therefrom, as the heat exchange fluid is removed from port 259.

The sheet retainers, and the various components thereof, such as the base plate and clamp member, may be fabricated from any suitable rigid material. For example, each sheet retainer may be fabricated from metals, thermoset plastic materials, thermoplastic materials, ceramic materials and combinations thereof. Typically the sheet retainers are fabricated from metals (e.g., steel).

Figure 9:
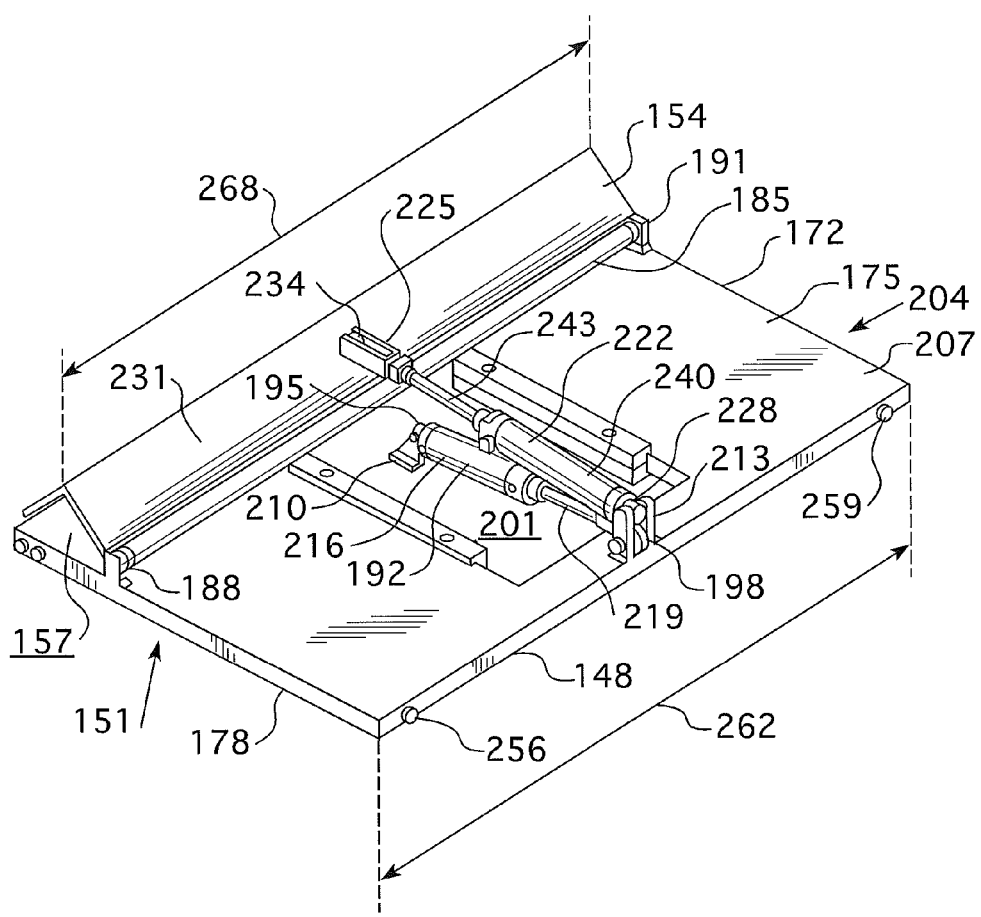
FIG. 9 is a representative perspective view towards the rear portion of a sheet retainer according to the present invention.

The sheet retainers may have any suitable dimension, provided they are able to retain a portion of the heated thermoplastic sheet within the clamp portion thereof. With reference to FIGS. 9 and 10, base plate 172 typically has a width 262 of from 7.62 cm to 127 cm, more typically from 15.24 cm to 101.6 cm, and further typically from 30.48 cm to 60.96 cm. In an embodiment, base plate 172 has a width 262 of 50.75 cm. Base plate 172 typically has a length 265 of from 7.62 cm to 127 cm, more typically from 15.24 cm to 101.6 cm, and further typically from 30.48 cm to 60.96 cm. In an embodiment, base plate 172 has a length 265 of 45.72 cm. Clamp member 154 typically has a width 268 of from 7.62 cm to 127 cm, more typically from 15.24 cm to 101.6 cm, and further typically from 30.48 cm to 60.96 cm. In an embodiment, clamp member 154 has a width 268 of 50.75 cm, which is substantially equivalent to the width 262 of base plate 172. Alternatively, the rear portion 204 and the forward portion 181 of base plate 172 may have different widths 262. For example, width 262 of rear portion 204 may be greater than (or less than) width 262 of forward portion 181.

The sheet molding apparatus of the present invention may further include an extruder 271 and a sheet die 274 (FIG. 2). The extruder includes a feed end 277 having a feed port 280, and a terminal (or extrudate) end 283. Extruder 271 may be selected from single screw, or counter- or co-rotating twin screw extruders that are known to the skilled artisan. Extruder 271 typically includes one or more heated zones along the length of its barrel 286, the temperature(s) of which is controllable. A thermoplastic composition, typically comprising at least one thermoplastic polymer and optionally one or more additives (e.g., glass fibers and/or antioxidants), is introduced into feed port 280, is melted and compounded as it moves through barrel 286, and emerges from terminal end 283 as a molten thermoplastic composition.

Terminal end 283 of extruder 271 is in fluid communication with sheet die 274. Fluid communication between terminal end 283 and sheet die 274 is typically achieved by means of a conduit 289. Conduit 289 may optionally be heated. The molten thermoplastic composition is forwarded from terminal end 283 of extruder 271, through conduit 289, and into sheet die 274. Sheet die 274 typically includes at least one interior channel that is in fluid communication with conduit 289, and a slot (not shown). In addition, sheet die 274 may be separately heated, so as to maintain the extruded thermoplastic material in a molten state. The slot is located on the bottom of sheet die 274, and the heated thermoplastic sheet 292 emerges from the slot. Passage of the molten thermoplastic material through the interior channel(s) and slot of sheet die 274 results in formation of a heated thermoplastic sheet 292 having a first surface 295 (FIG. 3) and a second surface 298.

Sheet die 274 may be a dynamic sheet die having a plurality of gates (not shown) that may each be independently controllably and reversibly moved, by separate actuators (not shown), across the slot of sheet die 274 so as to control the amount of molten thermoplastic material passing therethrough, and accordingly the thickness, width and shape of the heated thermoplastic sheet emerging therefrom and produced thereby. The gates may be operated so as to produce a heated thermoplastic sheet having openings (not shown) that are free of thermoplastic material. For example, as heated thermoplastic sheet 292 is formed, some of the gates forming interior portions of the sheet, may be closed for a predetermined amount of time and then reopened, thereby resulting in openings or slots being formed in the sheet.

Rather than a slot, sheet die 274 may have a plurality of laterally aligned openings (not shown) through which the molten thermoplastic material emerges. The openings are typically positioned such that molten thermoplastic material emerging from one opening merges and becomes continuous with the molten thermoplastic material emerging from its adjacent/neighboring opening(s), thereby forming the heated thermoplastic sheet. The plurality of laterally aligned openings in effect acting as a slot with regard to formation of the heated thermoplastic sheet. Each opening may have a reversibly and controllably closeable gate (not shown) associated therewith.

Sheet die 274, and first mold portion 11, frame 35 and the sheet retainers 148 may be positioned relative to each other in any suitable way, provided that the heated thermoplastic sheet 292 emerging from sheet die 274 may be contacted with the clamp interior 157 of each sheet retainer 148 and interior mold surface 14 of first mold portion 11. For example, sheet die 274 may be positioned so as to produce a heated thermoplastic sheet 292 that drops gravitationally downward (as depicted), and first mold portion 11, frame 35 and the sheet retainers 148 may together be positioned vertically (not depicted) so as to be parallel with the plane of the gravitationally dropping heated thermoplastic sheet.

In an embodiment of the present invention and as depicted in the drawings, first mold portion 11, frame 35 and the sheet retainers 148 are together positioned in a plane beneath sheet die 274, e.g., the plane defined by the x- and y-axes shown in FIG. 1. For purposes of reference, perimeter edge 17 lies substantially within the plane defined by the x- and y-axes of FIG. 1. As the heated thermoplastic sheet 292 is formed and drops vertically and gravitationally from sheet die 274: (i) sheet die 274 may be reversibly moveable within a plane above the plane in which first mold portion 11, frame 25 and each sheet retainer 148 resides; and/or (ii) first mold portion 11, frame 35 and each sheet retainer 148 may together be reversibly positionable in the plane beneath sheet die 274. Such relative movement of sheet die 274, and first mold portion 11, frame 35 and each sheet retainer 148 provides for contact of second sheet surface 298 with clamp interior 157, and optionally interior mold surface 14 of first mold portion 11. Sheet die 274 may be reversibly moveable by known means, such as on tracks or rails (not shown).

In an embodiment of the present invention, first mold portion 11, frame 35 and each sheet retainer 148 are together positioned and are reversibly moveable in a plane beneath sheet die 274, and sheet die 274 is substantially stationary.

To achieve reversible lateral movement of first mold portion 11, frame 35 and the sheet retainers 148 in concert in the plane beneath sheet die 274, first mold portion 11, frame 35 and each sheet retainer 148 together reside on platform 50. As described previously herein, first mold portion 11 rests on support structure 41, which includes a plurality of I-beams 44 extending upwardly from upper surface 47 of platform 50. Sheet retainers 148 rest on upper surface 38 of frame 35, which rests on support frame 36, which is (reversibly vertically) supported by the first and second screw actuator assemblies (53 and 56), which are attached to upper surface 47 of platform 50, as described previously herein in further detail. Platform 50 is positioned and reversibly moveable in the plane beneath sheet die 274 along the y-axis (e.g., as represented by the two headed arrow 301 of FIG. 1).

Platform 50 may be reversibly moveable in the plane beneath sheet die 274 by known locomotion means, such as skids, tracks, wheels alone, wheels in conjunction with rails, and combinations thereof (not shown). Platform 50 may be more particularly described as including a top plate 51, and upper surface 47 being the upper surface of top plate 51. Top plate 51 may itself be vertically and reversibly positionable (e.g., by pistons, not shown), such that everything residing on and/or attached to upper surface 47 (e.g., first mold portion 11, frame 35, sheet retainers 148, the first and second screw actuator assemblies 53 and 56, etc.) is vertically repositionable in concert along the z-axis. Vertically positioning the first mold portion 11, frame 35 and sheet retainers 148 together in concert may be undertaken for reasons including, but not limited to, positioning the clamp interiors 157 of each sheet retainer 148, and optionally interior surface 14 of first mold portion 11 closer to or further from sheet die 274, and more particularly closer to/further from the slot of sheet die 274 from which the heated thermoplastic sheet 292 emerges. Such vertical positioning of top plate 51 may be desirable for reasons including, but not limited to, controlling the thickness of the heated thermoplastic sheet 292 as it is contacted with clamp interiors 157 and interior surface 14 of first mold portion 11, and achieving such contact prior to necking of the extruded/heated thermoplastic sheet 292, as will be discussed in further detail herein.

In the method of the present invention, initially first mold portion 11 and frame 35 (along with sheet retainers 148) are positioned relative to each other such that upper surface 38 of frame 35 is located above perimeter edge 17 of first mold portion. See, for example, FIGS. 1 and 2. When the first mold portion is a first male mold portion (as depicted in the drawings), the initial position of the upper surface of the frame may be, in addition to being above the perimeter edge: (i) above the upper terminus of the interior mold surface of the first male mold portion; or (ii) above the perimeter edge and below the upper terminus of the interior mold surface of the first male mold portion. As depicted in the drawing figures, the upper surface 38 of frame 35 is initially positioned above perimeter edge 17 and above the upper terminus of interior mold surface 14. In the case of a female first mold portion (that is substantially recessed below the perimeter edge), the initial position of the frame is such that the upper surface thereof is above the perimeter edge and interior mold surface of the first female mold portion.

The relative positioning of frame 35 and first mold portion 11 may be achieved in accordance with the description provide previously herein. For example, the first and second screw actuator assemblies (53, 56) may be activated (e.g., by motor 106, and the various shafts and transfer gear boxes) so as to move frame support 36 and frame 35 (and, correspondingly, sheet retainers 148) vertically upward along the z-axis, such that upper surface 38 of frame 35 resides above perimeter edge 17, and as depicted in the drawings, the upper terminus of interior surface 14 of first mold portion 11.

The clamp member 154 of each sheet retainer 148 is adjusted to an open position, in the method of the present invention. Each clamp member 154 is positioned in an open position so as to provide access to each clamp interior 157, in particular from above each sheet retainer 148. See, for example, clamp member 154 of sheet retainer 148C of FIG. 8, and the clamp members 154 of each sheet retainer 148A-148C visible in FIG. 3, all of which are in an open position. In an embodiment, arm 243 of second linear actuator 222 is retracted (e.g., within cylinder 240), which serves to draw clamp member 154 rotationally backwards on hinge member 185, thus positioning clamp member 154 in an open position.

A heated thermoplastic sheet (e.g., 292) having a first surface (e.g., 295) and a second surface (e.g., 298) is formed from at least one thermoplastic composition, in the method of the present invention. The heated thermoplastic sheet has a temperature that allows it to be thermoformable (e.g., a thermoformable temperature), in particular, when: (i) contacted with and retained within the clamp interior of each sheet retainer; and (ii) contacted and drawn into intimate contoured contact with the interior mold surface of the first mold portion. While the temperature of the heated thermoplastic sheet may be equal to or greater than the melting point of the thermoplastic sheet, the temperature of the heated thermoplastic sheet is more typically equal to or greater than the softening point (or glass transition temperature) of the thermoplastic sheet, and less than the melting point of the thermoplastic sheet.

In an embodiment of the method of the present invention, the heated thermoplastic sheet has an interior portion that is interposed between the first and second surfaces of the heated thermoplastic sheet. The temperature of the heated thermoplastic sheet, in this embodiment, is substantially uniform (e.g., varying by less than or equal to 2° C. or 1° C.) through the first surface, the interior portion and the second surface thereof. In particular, the temperature is uniform when: (i) the first portion of the second surface of the heated thermoplastic sheet is contacted with the clamp interior of at least one sheet retainer, and (ii) the second portion of the second surface of said heated thermoplastic sheet is drawn against the interior mold surface of the first mold portion.

The temperature of the heated thermoplastic sheet may be determined by art-recognized methods, such as contacting thermocouples with the first and second surfaces of the heated thermoplastic sheet, and inserting a thermocouple into the interior portion of the heated thermoplastic sheet. Alternatively, or in addition thereto, remote temperature sensors, such as an infrared sensor, may be used to determine the temperature of the first and second surfaces of the heated thermoplastic sheet.

As used herein and in the claims, the term "sheet(s)" and similar terms, such as "sheet die(s)" and "heated thermoplastic sheet(s)" are inclusive of the term "film(s)," and similar terms, such as "film die(s)" and "heated thermoplastic film(s)". Upon emerging from the sheet die, and more particularly the slot of the sheet die, the heated thermoplastic sheet typically has a thickness of from 0.5 mm to 25 mm, more typically from 1.5 mm to 15 mm, and further typically from 6 mm to 12 mm. In an embodiment of the present invention, upon emerging from the sheet die, the heated thermoplastic sheet has a thickness of 9 mm. During the process of extending the heated thermoplastic sheet over and bringing it into contour matching contact with the interior mold surface of the first mold portion, the thickness of the heated thermoplastic sheet is typically reduced (relative to the heated thermoplastic sheet upon emerging from the sheet die slot). The shaped thermoplastic sheet of the molded article prepared by the method of the present invention, typically has a thickness of from 0.25 mm to 12.5 mm, more typically from 0.75 mm to 8 mm, and further typically from 3 mm to 6 mm. In an embodiment of the present invention, the shaped thermoplastic sheet of the molded article prepared by the method of the present invention has an average thickness of 4.5 mm.

The heated thermoplastic sheet formed in the course of the method of the present invention may have any suitable width and length. Since the heated thermoplastic sheet is typically formed by means of a sheet die, the width thereof typically depends on and is limited by the width of the sheet die, and more particularly the width of the elongated sheet slot of the sheet die. The heated thermoplastic sheet may have a width of, for example, from 2.5 cm to 5 m, or from 31 cm to 3 m, or from 61 cm to 2 m. The heated thermoplastic sheet may have any suitable length, since it is typically formed continuously in the method of the present invention. For example, the heated thermoplastic sheet may have a length of from 31 cm to 10 m, or from 61 cm to 2 m. In a particular embodiment of the present invention, the heated thermoplastic sheet has a width of 3 m (about 10 feet), and a length of 5 m (about 16.5 feet).

The heated thermoplastic sheet may be formed by known methods that involve melting a thermoplastic composition so as to form a molten thermoplastic composition, and then forming a heated thermoplastic sheet from the molten thermoplastic composition. In an embodiment, and as described previously herein, the thermoplastic composition is melted in an extruder 271 (e.g., a single screw, or co- or counter-rotating twin screw extruder) having a feed end 277 having a feed port 280, and a terminal (or extrudate) end 283. The terminal end 283 of the extruder is in fluid communication with a sheet die 274 (e.g., by means of conduit 289). A molten thermoplastic composition is formed within the extruder and forwarded to (by means of conduit 289) and passed through sheet die 274, so as to form the heated thermoplastic sheet (e.g., 292). The heated thermoplastic sheet typically emerges from a slot in the sheet die, and drops vertically and gravitationally therefrom. The sheet die may be selected and operated in accordance with the description provided previously herein.

The heated thermoplastic sheet 292 emerges from sheet die 274 such that the second surface 298 thereof faces (e.g., is in facing opposition to) the clamp interiors 157 of the sheet retainers 148 and interior mold surface 14 of first mold portion 11. The first surface 295 of heated thermoplastic sheet 292 faces away from (e.g., upward away from) the clamp interiors 157 of the sheet retainers 148 and interior mold surface 14.

Figure 12:
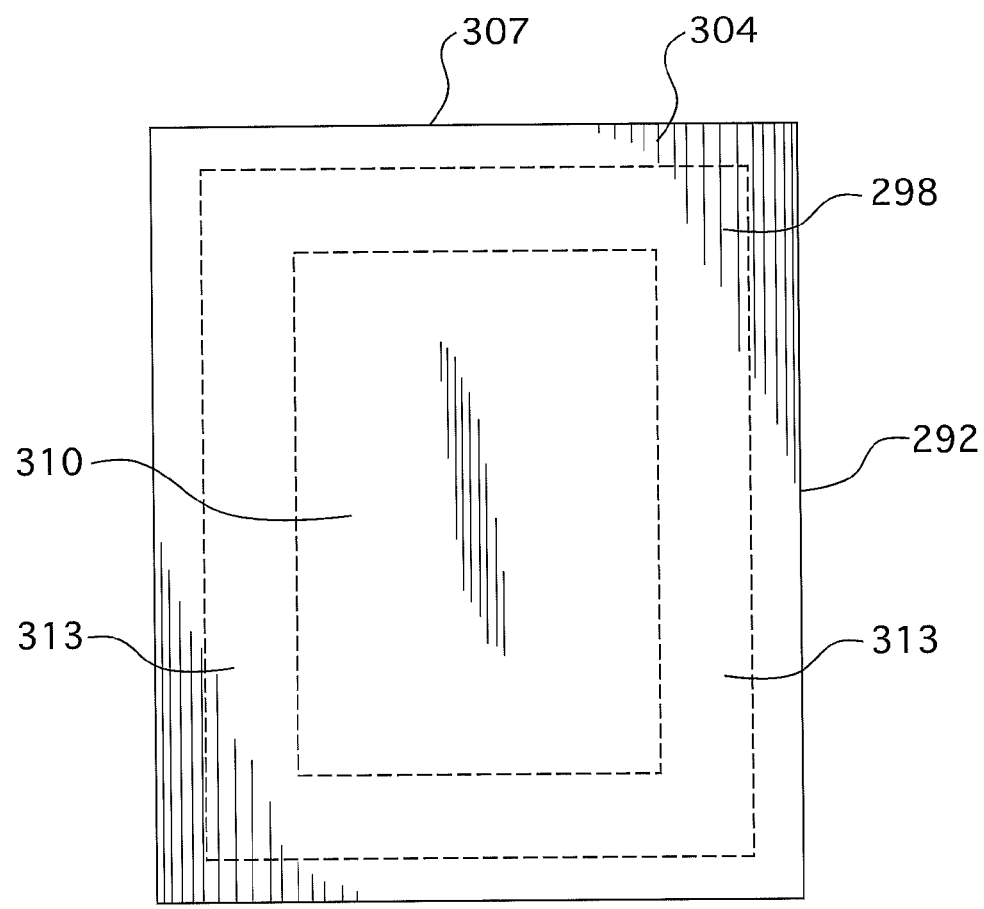
FIG. 12 is a representative plan view of the second surface of a heated thermoplastic sheet that is formed and used in the method of the present invention.

The second surface 298 of the heated thermoplastic sheet 292, and the heated thermoplastic sheet 292 itself, is described with regard to the present invention as having a first portion, a second portion, and a third portion. For purposes of illustration, and with reference to FIG. 12, first portion 304 of second surface 298 of heated thermoplastic sheet 292 is located generally near or towards the terminal edges 307 of sheet 292. Second portion 310 of second surface 298 is located generally in a central area of heated thermoplastic sheet 292. Third portion 313 of second surface 298 is located generally in an area between (e.g., interposed between) first portion 304 and second portion 310 of heated thermoplastic sheet 292. The first surface 295 also may be similarly described as having first 304, second 310 and third 313 portions that are on the opposite side (i.e., on first surface 295) relative to second surface 298 of heated thermoplastic sheet 292. In addition, the heated thermoplastic sheet 292 may be described more generally as having first 304, second 310 and third 313 portions corresponding to those portions as depicted in FIG. 12.

A first portion (e.g., 304) of the second surface 298 of the heated thermoplastic sheet is contacted with the clamp interior 157 of the clamp portion 151 of at least one sheet retainer 148, in the method of the present invention. Typically, as the heated thermoplastic sheet 292 is formed, it is sequentially contacted with the clamp interiors 157 of successively arranged sheet retainers 148. For example, as the heated thermoplastic sheet 292 emerges and extends downward from sheet die 274, frame 35, sheet retainers 148 and first mold portion 11 may be moved laterally (e.g., along the y-axis, FIG. 1) in a plane beneath sheet die 274 (as described previously herein), e.g., in the direction of arrow 302 of FIG. 3. With reference to FIGS. 1 and 3, as heated thermoplastic sheet 292 is formed and frame 35 and first mold portion 11 are moved laterally there-under, the first portion 304 of second surface 298 of heated thermoplastic sheet 292 is brought successively into contact with the clamp interior of sheet retainers 148 in the following sequential order: sheet retainer 148G; sheet retainers 148C and 148F; then sheet retainers 148B and 148E; sheet retainers 148A and 148D; and finally sheet retainer 148H.

In the method of the present invention, the clamp member 154 is next moved to a closed position so as to clamp and retain the first portion of the heated thermoplastic sheet received within the clamp interior 157. More particularly, a portion of clamp member 154 is brought into abutting and clamping/retaining relationship with first portion 304 of first surface 295 of heated thermoplastic sheet 292, while at the same time first portion 304 of second surface 298 of sheet 292 is retainingly abutted against upper surface 183 of forward portion 181 of base plate 172 of sheet retainer 148.

The clamp members of the sheet retainers may all be moved in unison to the closed position after the heated thermoplastic sheet has been contacted with the clamp interior of all the sheet retainers. For example, the clamp members 154 of sheet retainers 148A-148H may be moved to a closed position in unison. Alternatively, the clamp members of the sheet retainers may be sequentially moved to the closed position as the first portion of the second surface of the heated thermoplastic sheet is brought into successive contact with the clamp interiors of the sheet retainers. For example, the clamp members 154 of each sheet retainer 148 being moved to a closed position in the following sequential order: sheet retainer 148G; sheet retainers 148C and 148F; then sheet retainers 148B and 148E; sheet retainers 148A and 148D; and finally sheet retainer 148H.

Figure 4:
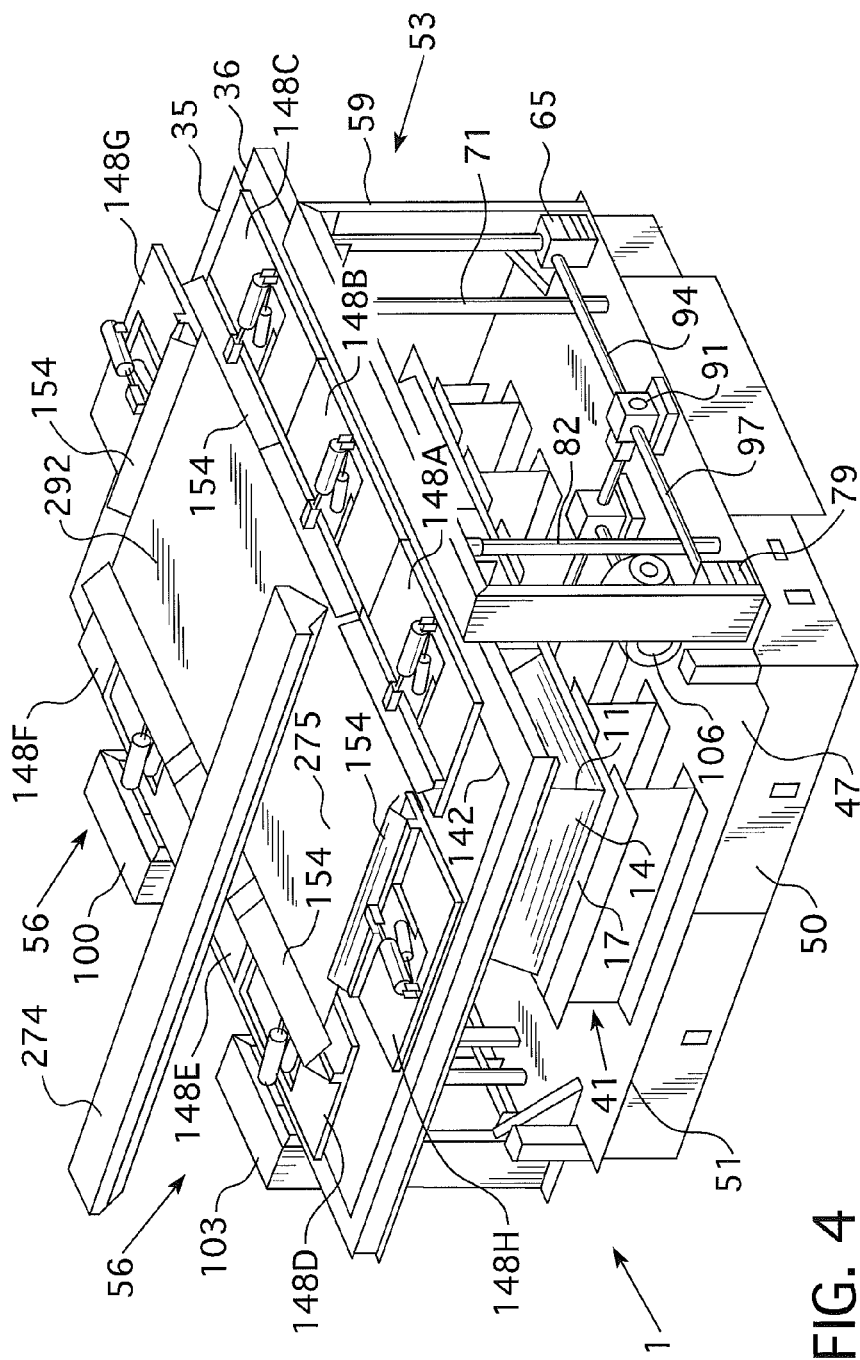
FIG. 4 is a representative perspective view of the sheet molding apparatus of FIG. 3, in which the heated thermoplastic sheet has been separated from the sheet die and is retained within the clamp portions of each sheet retainer.

In an embodiment, arm 243 of second linear actuator 222 is extended (e.g., out of cylinder 240), which serves to move clamp member 154 rotationally forward on hinge member 185, thus positioning clamp member 154 in a closed position. See for example, clamp member 154 of sheet retainer 148A of FIG. 8, which is in a closed position. With reference to FIG. 4, the clamp members 154 of all eight sheet retainers 148A-148H are in a closed position, with the first portion of the heated thermoplastic sheet 292 clamped and retained within the clamp interior 157 of each sheet retainer. In addition, in FIG. 4, the heated thermoplastic sheet 292 that is retained within the sheet retainers of frame 35, has been separated from sheet die 274. While not depicted in FIG. 4, a portion of heated thermoplastic sheet 292 may still be emerging from sheet die 274, but separated from the heated thermoplastic sheet 292 retained within the sheet retainers 248.

As described previously herein, clamp interior 157 may be defined by a combination of interior surface 160 of clamp member 154 and: (i) that portion of upper surface 38 of frame 35 residing there-under; and/or (ii) upper surface 183 of forward portion 181 of base plate 172 of the sheet retainer. In an embodiment, the first portion of the heated thermoplastic sheet is retained within clamp interior 157, which is defined by a combination of interior surface 160 of clamp member 154 and upper surface 183 of forward portion 181 of base plate 172 of the sheet retainer. Accordingly, the first portion of the heated thermoplastic sheet is clamped/retained between at least a portion of interior surface 160 of clamp member 154 and upper surface 183 of forward portion 181 of base plate 172 of the sheet retainer.

With the first portion of the heated thermoplastic sheet retained within the clamp interiors of the sheet retainers, first mold portion 11 and frame 35 are positioned relative to each other so as to contact a second portion of the second surface (e.g., 310, FIG. 12) of heated thermoplastic sheet 292 with at least a portion of the interior mold surface 14 of first mold portion 11. To achieve contact of the second portion of the second surface of the heated thermoplastic sheet with at least a portion of the interior mold surface: (i) first mold portion 11 may be vertically repositionable (e.g., moved upward along the z-axis), while frame 35 and sheet retainers 148 are vertically stationary; (ii) first mold portion 11 is vertically stationary, while frame 35 and sheet retainers 148 are vertically repositionable (e.g., moved downward along the z-axis); or (iii) first mold portion 11 may be vertically repositionable (e.g., moved upward along the z-axis), while at the same time frame 35 and sheet retainers 148 are vertically repositionable (e.g., moved downward along the z-axis).

In an embodiment, and with reference to FIGS. 4 and 5, first mold portion 11 is substantially stationary relative to vertical positioning, and frame 35 (along with sheet retainers 148) is reversibly and controllably vertically positionable (e.g., along the z-axis). In this embodiment, frame 35 (and correspondingly sheet retainers 148) is reversibly, controllably and vertically positioned (e.g., vertically downward along the z-axis) relative to the vertically stationary first mold portion 11, thereby resulting in contact of the second portion (e.g., 310) of the second surface (298) of the heated thermoplastic sheet 292 with at least a portion of the interior mold surface 14 of first mold portion 11. Frame 35 along with the sheet retainers 148 may be moved along the z-axis so as to be positioned below the perimeter edge 17 of first mold portion 11. Frame 35 may be reversibly and vertically positioned by means of the first and second screw actuator assembles (53, 56) in accordance with the description as provided previously herein.

Depending on the initial position of frame 35 relative to interior mold surface 14, contact of the second portion of the second surface of the heated thermoplastic sheet with at least a portion of the interior mold surface of the first mold portion, may occur prior to, concurrently with or subsequently to contact (or clamping retention) of the first portion of the second surface of the heated thermoplastic sheet with/within the clamp interior 157 of the clamp portion 151 of the sheet retainers 148. For example, frame 35 may be initially positioned such that the upper surface 38 thereof is above perimeter edge 17 and below the upper terminus of interior mold surface 14 of the first mold portion 11 (in the case of a male first mold portion), in which case the second portion of the second surface of the heated thermoplastic sheet may contact a portion of the interior mold surface prior to or concurrently with contact and/or retention of the second portion of the heated sheet with/within the clamp interiors. In an embodiment of the present invention, contact of the second portion of the second surface of the heated thermoplastic sheet with at least a portion of the interior mold surface of the first mold portion, occurs after contact (or clamping retention) of the first portion of the second surface of the heated thermoplastic sheet with/within the clamp interior 157 of the clamp portion 151 of the sheet retainers 148.

Prior to, concurrently with or subsequent to contact of the second portion of the second surface of the heated thermoplastic sheet with at least a portion of the interior mold surface of the first mold portion, each sheet retainer (with a first portion of the heated sheet retained within the clamp interior thereof) is independently laterally moved to a lateral position selected from towards the perimeter edge 17 and/or away from the perimeter edge 17 of first mold portion 11. For example, as frame 35 is moved vertically downward (and the second surface of the heated thermoplastic sheet is brought into contact with at least a portion of the interior mold surface of the first mold portion) each sheet retainer 148 may be continually and/or intermittently laterally repositioned relative to (i.e., towards and/or away from) perimeter edge 17 of first mold portion 14. Alternatively, each sheet retainer 148 may be independently laterally repositioned relative to perimeter edge 17, prior to frame 35 being moved vertically downward, and the second surface of the heated thermoplastic sheet correspondingly being brought into contact with at least a portion of the interior mold surface of the first mold portion. Further alternatively, each sheet retainer 148 may be independently laterally repositioned relative to perimeter edge 17, after frame 35 has been moved vertically downward (e.g., at the bottom of its vertical stroke), and the second surface of the heated thermoplastic sheet correspondingly has been brought into contact with at least a portion of the interior mold surface of the first mold portion.

In a particular embodiment of the method of the present invention, the step of laterally moving at least one sheet retainer to a lateral position (relative to the perimeter edge of the mold), is performed at least one of prior to, substantially concurrently with and after the step of: positioning the first mold portion and the frame relative to each other so as to contact the second portion of the second surface of said heated thermoplastic sheet with at least a portion of the interior mold surface of the first mold portion. More particularly, the step of laterally moving at least one sheet retainer to its relative lateral position, is performed substantially concurrently with and/or after the step of relative positioning the first mold portion and the frame. Still further particularly, the step of laterally moving at least one sheet retainer to its relative lateral position, is performed substantially concurrently with the step of relative positioning the first mold portion and the frame.

In an embodiment of the present invention and as described previously herein, each sheet retainer may be independently laterally repositioned by means of extending or retracting reversibly retractable arm 219 of first linear actuator 192. For example, as arm 219 is extended out of cylinder 216, sheet retainer 148 is moved laterally along the x-axis away from perimeter edge 17 of first mold portion 11. Correspondingly, as arm 219 is retracted within cylinder 216, sheet retainer 148 is moved laterally along the x-axis towards or in the direction of perimeter edge 17 of first mold portion 11.

Lateral movement of the sheet retainer(s) (with the first portion of the heated sheet retained/clamped within the clamp interiors thereof) serves to control the thickness of at least a portion of the second portion of the heated thermoplastic sheet that is contacted with the interior mold surface of the first mold portion. In addition, lateral movement of the sheet retainer(s) (with the first portion of the heated sheet retained/clamped within the clamp interiors thereof) also assists and enhances the intimate contour matching contact of the second portion of the second surface of the heated thermoplastic sheet with the interior mold surface of the first mold portion.

Without intending to be bound by any theory, and based on the evidence at hand, it is believed that as a sheet retainer is moved laterally towards the perimeter edge of the first mold portion, a greater amount of heated sheet material is made available as the heated sheet is brought into contact with the interior mold surface (whether the mold is a male or female mold). A greater amount of heated thermoplastic material being present over that portion of the mold where the sheet retainer is moved towards the mold, results in increased sheet thickness in that area (and accordingly a molded article having increased thickness in that area). Correspondingly, as a sheet retainer is moved laterally away from the perimeter edge of the first mold portion, a lesser amount of heated sheet material is made available as the heated sheet is brought into contact with the interior mold surface (whether the mold is a male or female mold). A lesser amount of heated thermoplastic material being present over that portion of the mold where a sheet retainer is move away from the mold, results in decreased sheet thickness in that area (and accordingly a molded article having decreased thickness in that area).

In the case of a plurality of laterally repositionable sheet retainers (e.g., 148 A-H) being located around the perimeter edge of the mold, the thickness of the heated sheet may be varied in/over different areas of the mold, as the result of, for example, some sheet retainers being moved towards the perimeter edge, while others are moved away from the perimeter edge of the mold.

In the case of a first mold portion having a complex interior mold surface, for example, having portions that may be characterized as male, and other portions that may be characterized as female, some sheet retainers may be moved laterally towards the perimeter edge, while other sheet retainers are moved laterally away from the perimeter edge. For example, those sheet retainers that are adjacent to male interior mold surface portions, may be moved laterally away from the perimeter edge; while those sheet retainers that are adjacent to female interior mold surface portions, may be moved laterally towards the perimeter edge; or visa versa. Alternatively, or in addition thereto, the lateral position of one or more sheet retainers may be adjusted (e.g., serial adjustments and/or continual adjustments) as the second surface of the heated thermoplastic sheet is brought into contact with the interior surface of the mold, such positions being selected from towards the mold perimeter edge, away from the mold perimeter edge, and any combination, order or additional combinations thereof (e.g., towards, away and towards, or away, towards and away).

Each sheet retainer, as discussed previously, may be laterally repositioned in the method of the present invention so as to affect control of the thickness of the heated thermoplastic sheet over various portions of the interior mold surface of the first mold portion. In an embodiment, each sheet retainer may be moved through a lateral distance (e.g., towards or away from the mold perimeter edge) that is typically from 2.54 cm to 91.44 cm, more typically from 5.08 cm to 60.96 cm, and further typically from 7.62 cm to 30.48 cm. In an embodiment, each sheet retainer may be moved through a lateral distance (e.g., towards or away from the mold perimeter edge) of approximately 19.05 cm.

Figure 6:
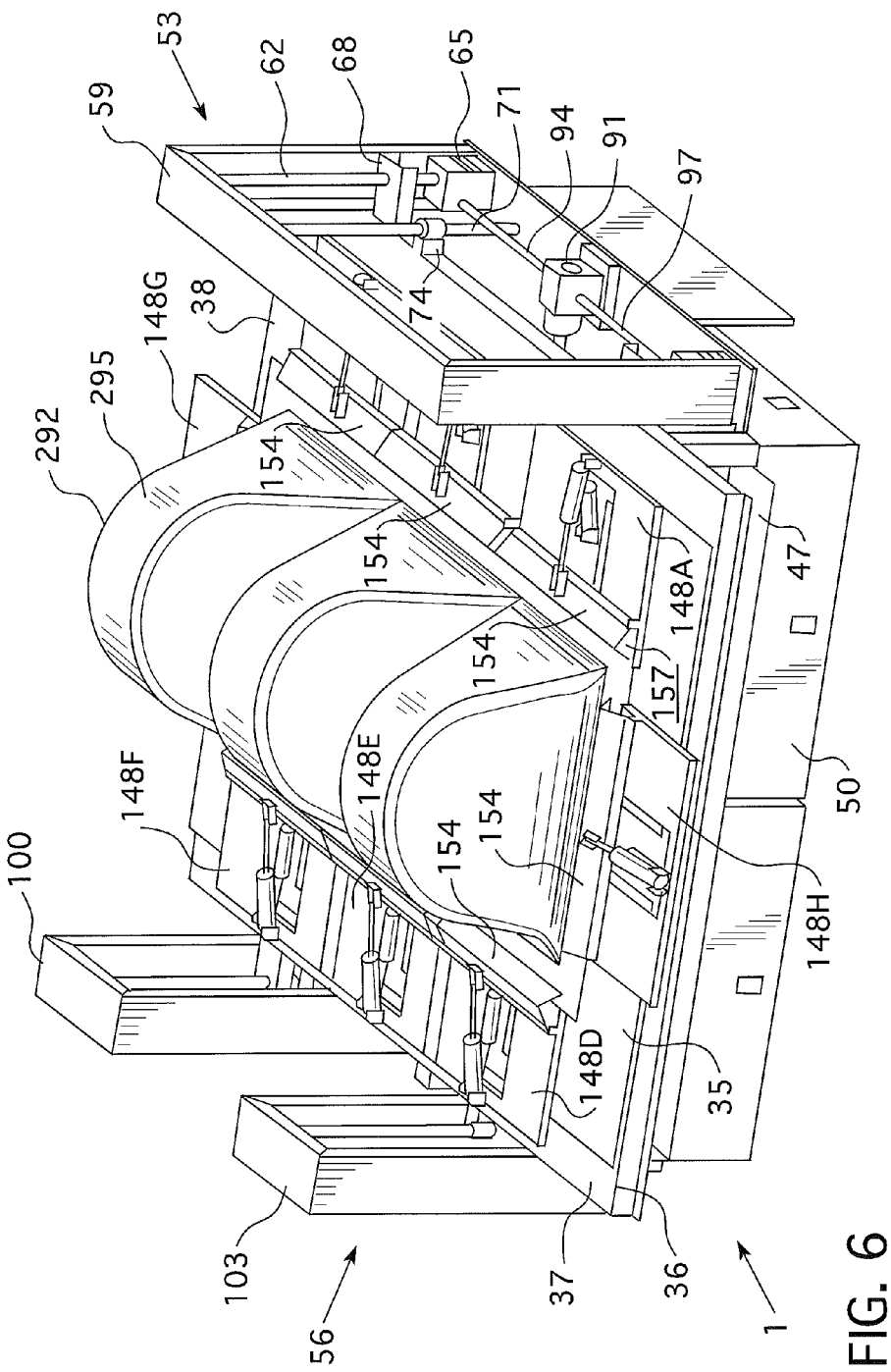
FIG. 6 is a representative perspective view of the sheet molding apparatus of FIG. 5 in which the heated thermoplastic sheet has been drawn by reduced pressure into contour matching contact with the interior surface of the first mold portion, while still being held within the clamp portions of the sheet retainers.

With at least a portion of the second portion of the second surface of the heated thermoplastic sheet in contact with at least a portion of the interior mold surface of the first mold portion, reduced pressure is drawn (e.g., by means of first vacuum apparatus 29 and conduit 32) through the plurality of perforations (e.g., 26) of the interior mold surface. The second portion of the second surface of the heated thermoplastic sheet is drawn (as a result of the reduced pressure) into intimate contact with and matches the contour of the interior mold surface. See, for example, FIG. 6.

The interior mold surface of the first mold portion may optionally be heated so as to assist matching of the second portion of the second surface of the heated thermoplastic sheet with the contoured interior mold surface. As a result of, however, the residual heat retained within the heated thermoplastic sheet (due to its use upon formation, e.g., upon exiting the sheet die), separately heating the interior mold surface of the first mold portion is typically not required in the method of the present invention. In addition, in light of the residual heat retained within the heated thermoplastic sheet, separate or external heating of the heated thermoplastic sheet is typically not required in the method of the present invention.

While maintained in intimate contour matching contact with the interior mold surface, the heated thermoplastic sheet is cooled. Cooling of the heated thermoplastic sheet results in the formation of a shaped thermoplastic sheet that retains the contour of the interior mold surface of the first mold portion. The heated thermoplastic sheet is typically cooled to a temperature that is less than the softening point or glass transition temperature of the thermoplastic sheet. When cooled to a temperature below its softening point or glass transition temperature, the thermoplastic sheet is no longer thermoformable, and as such retains the contoured shape of the interior mold surface.

Cooling of the heated thermoplastic sheet may be achieved by known means. For example, cool air may be passed over the first surface of the heated thermoplastic sheet, and/or the interior mold surface of the first mold portion may be cooled (e.g., by means of a chilled fluid or coolant being passed through conduits located under the interior mold surface of the first mold portion—not shown).

After the thermoplastic sheet has been sufficiently cooled, the resulting shaped thermoplastic sheet (or molded article) is removed from the first mold portion. Removal of the shaped thermoplastic sheet from the first mold portion may be achieved by art-recognized methods. For example, one or more ejector cores (not shown) may extend reversibly outward from the interior mold surface, in effect pushing the shaped thermoplastic sheet off of and away from the first mold portion. Alternatively, or in addition thereto, a gas (e.g., air) may be passed under pressure through the plurality of perforations (e.g., 26) in the interior mold surface, thereby lifting the shaped thermoplastic sheet off of and away from the first mold portion.

In accordance with the method of the present invention, an excess portion of the thermoplastic sheet extends from the perimeter edge (e.g., 17) of the first mold portion 11 into the clamp interior 157 of the clamp portion 151 of the sheet retainer(s) 148. This excess portion of the thermoplastic sheet may be used to assist removal of the shaped thermoplastic sheet (or molded article) from the interior surface of the first mold portion. In an embodiment of the present invention and with reference to FIG. 6, after the thermoplastic sheet has cooled and hardened and with the excess portion of the thermoplastic sheet within (e.g., retained within) the clamp interior 157 of the clamp portion 151 of the sheet retainer(s) 148, frame support 36 and frame 35 are moved vertically upward, which results in the shaped thermoplastic sheet (292) being lifted off of and removed from interior surface 14 of first mold portion 11. With the excess portion of the thermoplastic sheet within the clamp portion of the sheet retainers, frame 35 may be moved vertically upward any suitable distance so as to effect separation of the shaped thermoplastic sheet from the first mold portion, such as 5%, 10%, 25%, 50%, 75% or 100% of the total vertical distance that frame 35 is moved in the method of the present invention (e.g., the total vertical distance traveled as depicted between FIG. 1 and FIG. 6).

The excess portion of the thermoplastic sheet extending from the perimeter edge of the first mold portion into the clamp interior 157 of the clamp portion 151 of the sheet retainer(s) 148, is typically detached along the perimeter edge at some point after the heated thermoplastic sheet has been drawn by reduced pressure into intimate contour matching contact with the interior mold surface of the first mold portion. The excess thermoplastic sheet material may be detached prior to or after the shaped thermoplastic sheet is removed from the first mold portion. Typically, the excess thermoplastic sheet material is detached after removal of the shaped thermoplastic sheet from the first mold portion.

The excess thermoplastic sheet material may optionally be detached after the shaped thermoplastic sheet is removed from the first mold portion. The excess thermoplastic sheet material may, for example, be used to secure and transport the shaped thermoplastic sheet (molded article) during post-molding operations, such as sanding, applying labels, cutting holes, inserting attachments and/or painting. After completion of the post molding operations, the excess thermoplastic sheet material may then be detached from the shaped thermoplastic sheet.

As the heated thermoplastic sheet drops vertically and gravitationally from the sheet die, it may be subject to necking, which causes the width of the heated thermoplastic sheet to decrease. For purposes of illustration, and with reference to FIG. 13, heated thermoplastic sheet 292 is depicted as exhibiting the phenomenon of necking. As heated thermoplastic sheet 292 drops through vertical distance 316, a pre-necked portion 319 having an initial width 322 is formed. After heated thermoplastic sheet 292 drops further through vertical distance 325, the phenomenon of necking occurs and a transition portion 328 is formed having a variably decreasing width. After falling through distance 325, the necking phenomenon is complete and a necked portion 331 having a stabilized width of 334 is formed. Width 334 of necked portion 331 is smaller than width 322 of initial portion 319 of heated thermoplastic sheet 292.

The phenomenon of sheet necking may have numerous causes, including but not limited to, the molten thermoplastic composition, the configuration of the sheet die (e.g., the shape of its slot), the temperature of the heated thermoplastic sheet as it emerges from the sheet die, and combinations thereof. The phenomenon of necking is typically undesirable, since the resulting reduction in the width of the heated thermoplastic sheet usually necessitates the use of a wider, heavier and more expensive sheet die.

Figure 13:
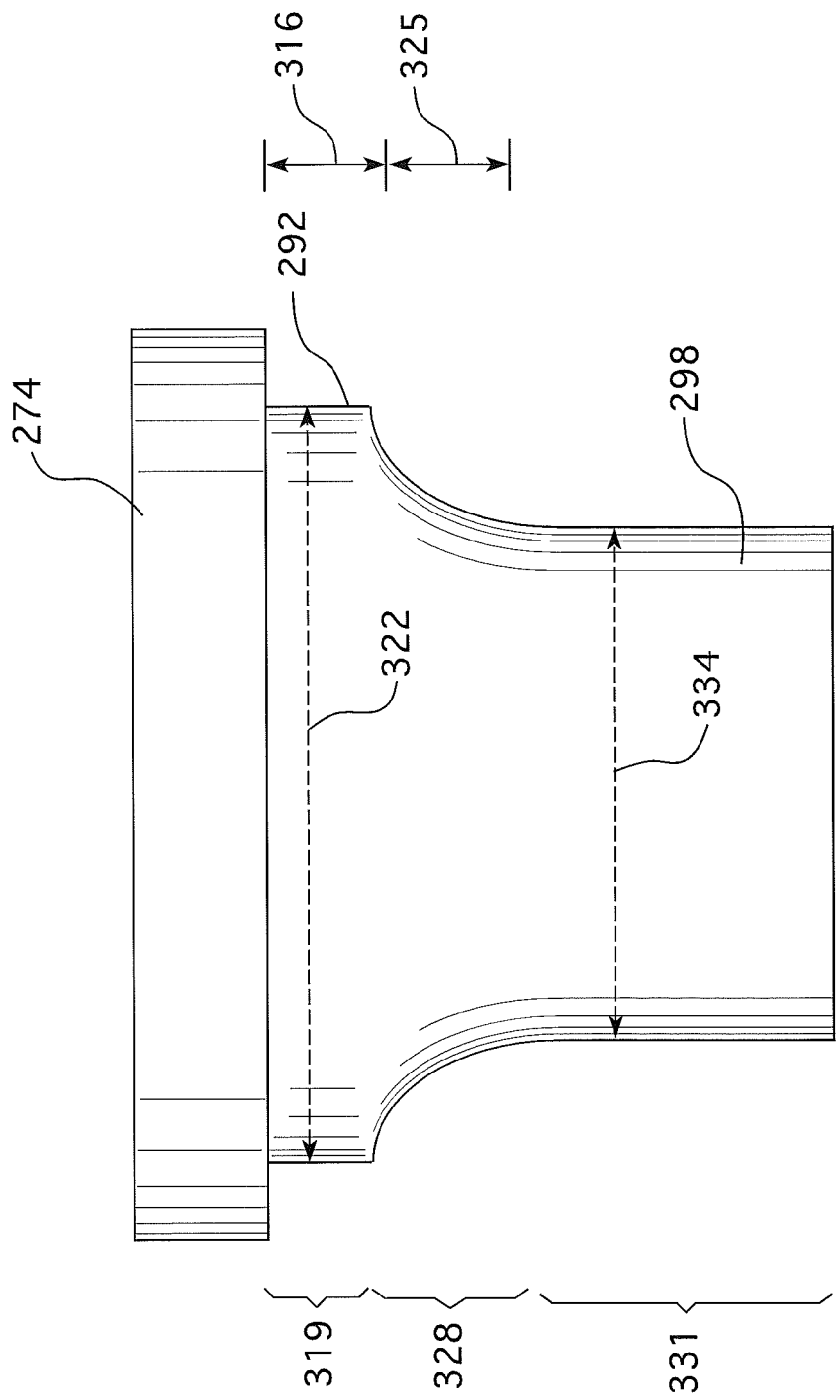
FIG. 13 is a representative elevational view of the second surface of a heated thermoplastic sheet as it emerges from the sheet die, in which the heated thermoplastic sheet exhibits necking.

In an embodiment of the present invention, the step of contacting the first portion of the second surface of the heated thermoplastic sheet with the clamp interior 157 of the clamp portion 151 of the sheet retainer 148 (and optionally clamping/retaining the sheet within the clamp interior) occurs prior to necking of the heated thermoplastic sheet. Contacting the heated thermoplastic sheet with the clamp interior of the sheet retainer (and optionally further clamping the heated sheet therein) prior to necking, substantially prevents necking of the heated thermoplastic sheet. With further reference to FIG. 13, for example, when the first portion of the second surface 298 of heated thermoplastic sheet 292 is contacted with and optionally clamped/retained within the clamp interior of a sheet retainer within vertical distance 316 (i.e., before necking occurs), necking of the heated thermoplastic sheet is substantially prevented, and the heated thermoplastic sheet retains its initial (non-necked) width 322.

As discussed previously with regard to the sheet molding apparatus, in an embodiment of the method of the present invention, the first mold portion, the frame and correspondingly the sheet retainers are together positioned and moveable in a plane (e.g., the plane defined by the x- and y-axes of FIG. 1) beneath the sheet die, and the sheet die is substantially stationary. The first mold portion 11 and the frame 35 (with sheet retainers 148 thereon) may together reside on a platform 50 that is moveable within the plane beneath sheet die 274, in accordance with the description previously provided herein. First mold apparatus 11 resides on mold support structure 41, which rests on upper surface 47 of platform 50, and frame 35 being supported by first and second screw actuator assemblies (53, 56), which are attached to upper surface 47 of platform 50.

In this particular embodiment, the method further includes moving the first mold portion, the frame and the sheet retainers together in the plane beneath the sheet die as the thermoplastic sheet is formed, thereby facilitating contact between the heated thermoplastic sheet and the clamp interior of each sheet retainer and the interior mold surface of the first mold portion. As the first mold portion and sheet retainers are moved beneath the sheet die, the heated thermoplastic sheet is in effect draped there-across. See, for example, FIGS. 1 through 4. With reference to FIG. 3, the linear speed at which the first mold portion 11, frame 35 and sheet retainers 148 are moved beneath sheet die 274 (e.g., on platform 50 in the direction indicated by arrow 302), and the rate at which heated thermoplastic sheet 292 is produced from sheet die 274, may together be controlled so as to control the thickness of the heated thermoplastic sheet 292 as it is draped across the mold and clamp interiors of the sheet retainers. The rate of linear movement and rate of heated thermoplastic sheet formation may each be variably and independently controlled so as to vary the thickness of the heated thermoplastic sheet across the interior mold surface.

In FIGS. 3 and 4, for purposes of clarity, heated thermoplastic sheet 292 is depicted as being rigid. Since heated thermoplastic sheet 292 has a temperature that is at least greater than its softening point, in practice, heated thermoplastic sheet 292 more typically drapes across the clamp interiors 157 of the sheet retainers 148 and optionally a portion of interior mold surface 14 (rather than rigidly residing thereon/therein and/or there-over).

In the method of the present invention, the heated thermoplastic sheet is typically detached from the sheet die at some point after it has been contacted with the clamp interiors of the sheet retainers, and before the shaped thermoplastic sheet is removed from the first mold portion. In an embodiment, the method includes detaching the heated thermoplastic sheet from the sheet die prior to, concurrently with or after the step of: positioning the first mold portion and the frame relative to each other so as to contact the second portion of the second surface of the heated thermoplastic sheet with at least a portion of the interior mold surface of the first mold portion. With reference to FIG. 4, heated thermoplastic sheet 292 has been detached from sheet die 274: after the first portion of the heated sheet has been retained within the clamp portions of the sheet retainers; and prior to positioning the first mold portion and the frame relative to each other so as to contact the second portion of the second surface of the heated thermoplastic sheet with at least a portion of the interior mold surface of the first mold portion.

The sheet molding apparatus of the present invention may further include a second mold portion having an interior mold surface, in which case the method may further include the step of contacting compressively the interior mold surface of the second mold portion with the first surface of the heated thermoplastic sheet. Contact of the interior mold surface of the second mold portion with the first surface of the heated thermoplastic sheet, is performed: (i) after the second portion of the second surface of the heated thermoplastic sheet has been drawn into intimate contour matching contact with the interior mold surface of the first mold portion (by means of reduced pressure drawn through the perforations of the interior mold surface of the first mold portion); and (ii) before cooling of the heated thermoplastic sheet (and the corresponding formation of the shaped thermoplastic sheet).

Figure 14:
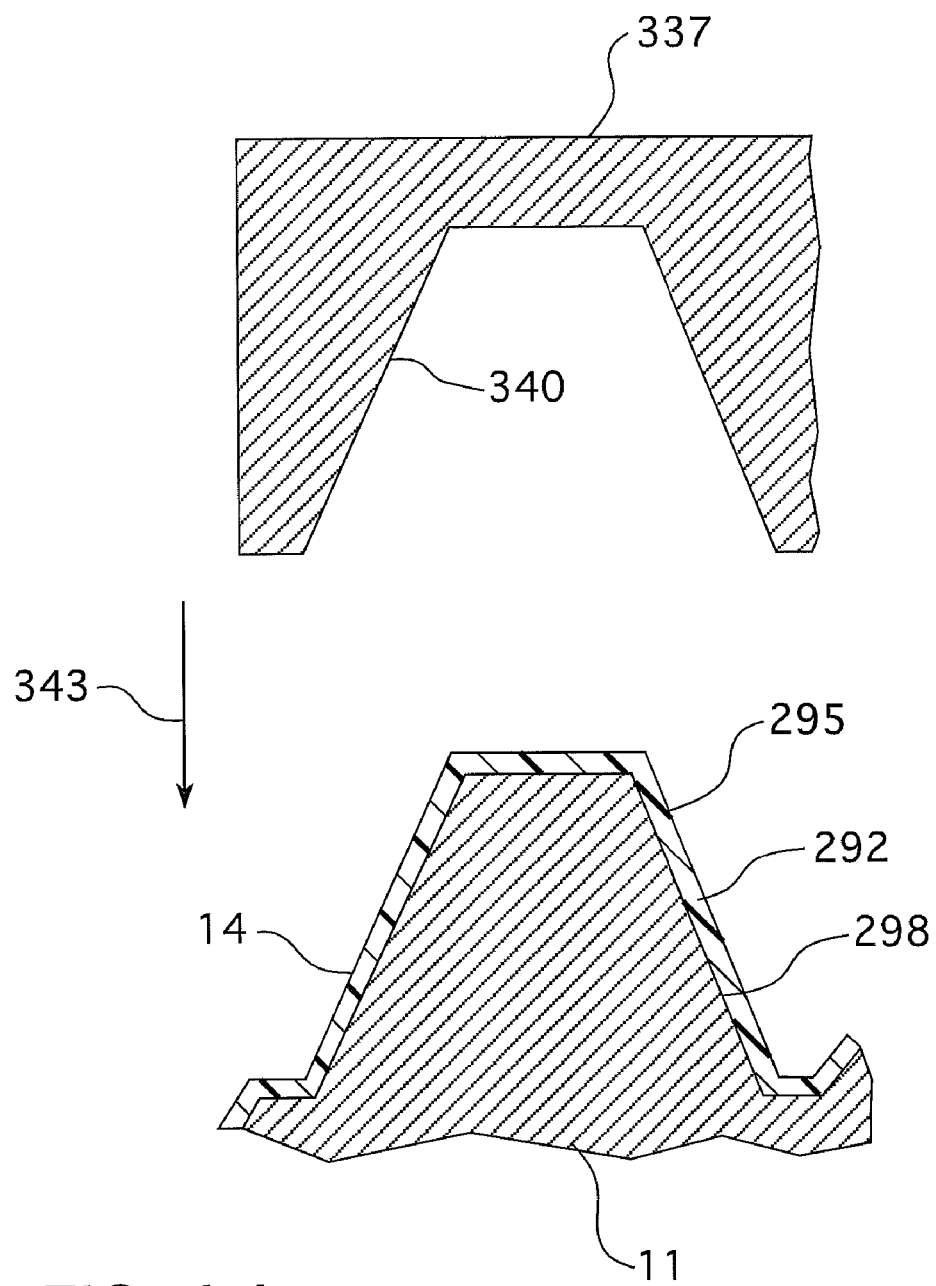
FIG. 14 is a representative partial side sectional view of a portion of the mold apparatus as depicted in FIG. 6, further including a second mold portion.

With reference to FIG. 14, second mold portion 337 has an interior mold surface 340. First mold portion 11 and second mold portion 337 are reversibly positionable relative to each other (e.g., along arrow 343), such that interior mold surface 14 of first mold portion 11 and interior mold portion 340 of second mold portion 337 are in reversibly positionable facing opposition relative to each other. More particularly, first surface 295 of heated thermoplastic sheet 292 and interior mold portion 340 of second mold portion 337 are in reversibly positionable facing opposition relative to each other (as depicted). When second mold portion 337 is moved in the direction represented by arrow 343 towards first mold portion 11, interior mold surface 340 of second mold portion 337 compressively contacts first surface 295 of heated thermoplastic sheet 292. Second mold portion 337 may be moved by known means, such as on vertical rails by means of a piston (not shown). Second mold portion 337 is typically located at a remote compression molding station relative to the heated thermoplastic sheet formation station (where sheet die 274 is located). Generally, platform 50 is moved by known locomotion means (e.g., on rails, as described previously herein) to the remote compression molding station, and second mold portion 337 is brought into compressive contact with first surface 295 of heated thermoplastic sheet 292.

Interior mold surface 340 of second mold portion 337 is typically brought into compressive contact with first surface 295 of heated thermoplastic sheet 292 at a compressive force of 1.0 Kg/cm$^2$ to 4.0 Kg/cm$^2$ (14 to 57 psi), more typically from 1.2 Kg/cm$^2$ to 2.0 Kg/cm$^2$ (17 to 28 psi), and further typically from 1.3 Kg/cm$^2$ to 1.8 Kg/cm$^2$ (19 to 27 psi). In an embodiment, interior mold surface 340 of second mold portion 337 is typically brought into compressive contact with first surface 295 of heated thermoplastic sheet 292 at a compressive force of 1.5 Kg/cm$^2$ (21 psi).

Contact of the interior mold surface of the second mold portion with the first surface of the heated thermoplastic sheet may be undertaken for reasons including, but not limited to: imparting surface features into the first surface of the heated thermoplastic sheet; controlling the thickness of the sheet;

and/or smoothing the first surface of the sheet. The interior mold surface of the second mold portion may be smooth, or it may include raised and/or lowered portions.

Certain of the various steps of the method of the present invention, as discussed previously herein, may be performed sequentially as recited, concurrently, or in reverse order. In an embodiment of the present invention, steps (a) through (k) are performed substantially sequentially as recited in the Summary of the Invention herein.

In a further embodiment of the method of the present invention, the step of: (h) moving laterally at least one sheet retainer to a lateral position (relative to the perimeter edge of the first mold portion), is performed at least one of prior to, substantially concurrently with and after the step of: (g) positioning the first mold portion and the frame relative to each other so as to contact the second portion of the second surface of the heated thermoplastic sheet with at least a portion of the interior mold surface of the first mold portion. In a particular embodiment, the step of: (h) moving laterally at least one sheet retainer to its lateral position (relative to the perimeter edge of the first mold portion), is performed substantially concurrently with the step of; (g) positioning the first mold portion and the frame relative to each other so as to contact the second portion of the second surface of the heated thermoplastic sheet with at least a portion of the interior mold surface of the first mold portion.

In another embodiment of the method of the present invention, the step of: (i) drawing reduced pressure through the plurality of perforations of the interior mold surface of the first mold portion, such that the second portion of the second surface of the heated thermoplastic sheet substantially matches the contour of the interior mold surface of the first mold portion, is performed one of concurrently with and sequentially after the step of: (h) moving laterally at least one sheet retainer to a lateral position (relative to the perimeter edge of the first mold portion).

The steps of: (g) positioning the first mold portion and the frame relative to each other so as to contact the second portion of the second surface of the heated thermoplastic sheet with at least a portion of the interior mold surface of the first mold portion; (h) moving laterally at least one sheet retainer to its lateral position (relative to the perimeter edge of the first mold portion); and (i) drawing reduced pressure through the plurality of perforations of the interior mold surface of the first mold portion, such that the second portion of the second surface of the heated thermoplastic sheet substantially matches the contour of the interior mold surface of the first mold portion, may, in an embodiment, be performed substantially concurrently.

In the method of the present invention, the step of drawing the second portion of the second surface of the heated thermoplastic sheet into intimate contoured contact (via reduced pressure) with the interior mold surface of the first mold portion may be assisted or enhanced by forming a seal between the second surface of the heated thermoplastic sheet and the perimeter edge of the first mold portion. In particular, a third portion (e.g., 313 of FIG. 12) of the second surface 298 of the heated thermoplastic sheet 292 is contacted with the perimeter edge 17 (and, in particular, the entire perimeter edge) of the first mold portion 11, thereby forming a seal between the third portion and the perimeter edge. After or concurrently with formation of the sheet-perimeter edge seal, the step of drawing reduced pressure through the perforations (e.g., 26) of the interior surface (e.g., 14) of the first mold portion may then be undertaken. A vacuum or near vacuum may be formed in the enclosed/sealed space defined by the second portion of the second surface of the heated thermoplastic sheet and the interior mold surface, as reduced pressure is drawn through the perforations of the interior mold surface. The formation of the vacuum or near vacuum, thus results in the heated thermoplastic sheet being efficiently drawn down onto the interior mold surface.

The method of the present invention may also include the step of incorporating one or more films (e.g., in the form of a label or continuous film strip) onto the first surface of the heated thermoplastic sheet as it is formed, and while the sheet has a temperature that allows it to be thermoformable (e.g., as or shortly after the heated thermoplastic sheet emerges from the sheet die). Typically, the film is applied to the first surface of the heated thermoplastic sheet as the sheet is formed, and prior to the step of positioning the first mold portion and the frame relative to each other so as to contact a second portion of the second surface of said heated thermoplastic sheet with at least a portion of the interior mold surface of said first mold portion.

The films may be single layer or multilayered films, and include at least one plastic layer selected from thermoset plastic layers and/or thermoplastic layers. The thermoset and thermoplastic materials of the film layers may be selected from materials that are known to the skilled artisan. The thermoplastic materials of the thermoplastic layer(s) of the film may, for example, be selected from those thermoplastic materials recited herein with regard to the heated thermoplastic sheet. Typically, the film includes at least one thermoplastic layer (e.g., a layer of linear low density polyethylene—LLDPE). The films have a second surface that abuts (e.g., is fused with) the first surface of the heated thermoplastic sheet, and a first surface that faces outward relative to and is not in abutting relationship with the first surface of the heated thermoplastic sheet.

In addition to at least one plastic layer, the films may further optionally include at least one non-plastic layer selected from, for example, metallic layers and paper layers. Typically, a non-plastic layer, if present, is interposed between two plastic layers. The films may optionally, in addition to at least one plastic layer, further include at least one adhesive layer. The adhesive layer, if present, typically defines an exterior layer or surface (e.g., the second surface) of the film, and is positioned so as to contact adhesively the first surface of the heated thermoplastic sheet. The film may include colorants (e.g., dyes and/or pigments) and/or indicia. The indicia may, for example, be selected from symbols, letters, numbers, designs, photographic depictions, and combinations thereof. The indicia may be applied to the first (or outer) surface of the film, and/or may be embedded within the film. In an embodiment, the indicia are in the form of bar codes, such as one and/or two dimensional bar codes.

The film may have any suitable thickness, provided it can be applied to the first surface of the heated thermoplastic sheet without being damaged (e.g., torn and/or having holes melted there-through). For example, the film may have a thickness of from 0.05 mm to 0.76 mm, or 0.08 mm to 0.64 mm, or from 0.13 mm to 0.51 mm. In an embodiment, the film is a single layer thermoplastic film (e.g., a single layer LLDPE film) having a thickness of 0.38 mm.

In a particular embodiment, the film is in the form of a continuous film strip (e.g., in the form of a ribbon or tape). The continuous film strip resides on a roll (not shown) that is positioned above the first surface (295) of the heated thermoplastic sheet (292). As the heated thermoplastic sheet 292 emerges from sheet die 274 and is laid across frame 35 and sheet retainers 148, the roll of film is turned so as to feed out the continuous film strip in a direction that is substantially aligned with the direction at which the sheet is formed and laid down (e.g., the machine direction, as depicted by arrow 302 of FIG. 3). The second surface of the continuous film strip contacts the first surface of the heated thermoplastic sheet as it is formed. The second surface of the continuous film strip may be pressed against the first surface of the heated thermoplastic sheet by suitable means, such as an air knife that expels pressurized (and, optionally, heated) air against the first surface of the continuous film strip. The air knife is typically placed at an intermediate position vertically interposed between the roll of continuous film strip and the first surface of the heated thermoplastic sheet (as it is laid across frame 35). In an embodiment, the second surface of the continuous film strip is defined by a thermoplastic layer, which becomes fused to/with the first surface the heated thermoplastic sheet. In a particular embodiment, the continuous film strip is fabricated from a single thermoplastic layer (e.g., comprising LLDPE), and has a thickness of 0.13 mm to 0.51 mm (e.g., 0.38 mm).

Applying a continuous film strip to a portion of the first surface of the heated thermoplastic sheet, as the sheet is formed and in the direction of sheet formation, results in the formation of a molded article having a continuous film strip extending along at least a portion of the first surface thereof. The continuous film strip so applied to the first surface of the shaped thermoplastic sheet/molded article, may be used to identify and/or align a plurality of such molded articles (e.g., in the case of a plurality of fluid management structures, such as storm water chambers or waste water chambers).

In the method of the present invention, the heated thermoplastic sheet is formed (e.g., by melt compounding/extrusion) from at least one thermoplastic composition. The thermoplastic composition includes at least one thermoplastic material. As used herein and in the claims, the term "thermoplastic material" and similar terms, means a plastic material that has a softening and melting point, and is substantially free of a three dimensional crosslinked network resulting from the formation of covalent bonds between chemically reactive groups, e.g., active hydrogen groups and free isocyanate groups. Examples of thermoplastic materials that may be included in the thermoplastic composition include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylon itrile-butadiene-styrene, thermoplastic styrene-acrylonitrile, thermoplastic acrylonitrile-stryrene-acrylate and combinations thereof (e.g., blends and/or alloys of at least two thereof).

In an embodiment of the present invention, the thermoplastic material of each thermoplastic composition is independently selected in each case from thermoplastic polyolefins. As used herein and in the claims, the term "polyolefin" and similar terms, such as "polyalkylene" and "thermoplastic polyolefin," means polyolefin homopolymers, polyolefin copolymers, homogeneous polyolefins and/or heterogeneous polyolefins. For purposes of illustration, examples of polyolefin copolymers include those prepared from ethylene and one or more $C_3$-$C_{12}$ alpha-olefin, such as 1-butene, 1-hexene and/or 1-octene.

The polyolefins, from which the thermoplastic material of each thermoplastic composition, may in each case be independently selected include, but are not limited to, heterogeneous polyolefins, homogeneous polyolefins, and combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The thermoplastic material of each thermoplastic composition may independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the thermoplastic material. The reinforcing fibers, and the glass fibers in particular, may have sizings on their surfaces to improve miscibility and/or adhesion to the thermoplastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The thermoplastic sheet may include fibers having lengths that are at least 50 or 85 percent of the lengths of the fibers that are present in the feed materials from which the thermoplastic sheet is prepared, such as from 0.25 inches to 2 or 4 inches (0.64 cm to 5.08 or 10.16 cm). The average length of fibers present in the thermoplastic sheet may be determined in accordance with art recognized methods. For example, the thermoplastic sheet may be pyrolyzed to remove the thermoplastic material, and the remaining or residual fibers microscopically analyzed to determine their average lengths, as is known to the skilled artisan.

Fibers are typically present in the thermoplastic composition, and accordingly the thermoplastic sheet, in amounts selected independently from 5 to 70 percent by weight, 10 to 60 percent by weight, or 30 to 50 percent by weight (e.g., 40 percent by weight), based on the total weight of the thermoplastic sheet (i.e., the weight of the thermoplastic material, the fiber and any additives). Accordingly, the shaped thermoplastic sheet prepared by the method of the present invention may include fibers in amounts of from 5 to 70 percent by weight, 10 to 60 percent by weight, or to 50 percent by weight (e.g., 40 percent by weight), based on the total weight of the thermoplastic sheet.

The fibers may have a wide range of diameters. Typically, the fibers have diameters of from 1 to 20 micrometers, or more typically from 1 to 9 micrometers. Generally each fiber comprises a bundle of individual filaments (or monofilaments). Typically, each fiber is composed of a bundle of 10,000 to 20,000 individual filaments.

Typically, the fibers are uniformly distributed throughout the thermoplastic material of the thermoplastic sheet. During mixing of the fibers and the thermoplastic material, the fibers generally form bundles of fibers typically comprising at least 5 fibers per fiber bundle, and preferably less than 10 fibers per fiber bundle. While not intending to be bound by theory, it is believed based on the evidence at hand, that fiber bundles containing 10 or more fibers may result in a molded article (shaped thermoplastic sheet) having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100×((number of bundles containing 10 or more fibers)/(total number of observed fibers)). Generally, the heated thermoplastic sheet and the shaped thermoplastic sheet each have a Degree of Combing of less than or equal to 60 percent, and typically less than or equal to 35 percent.

In addition or alternatively to reinforcing material(s), the thermoplastic composition(s), from which the heated thermoplastic sheet is prepared, may optionally include one or more additives. Additives that may be present in the thermoplastic composition include, but are not limited to, antioxidants, colorants, e.g., pigments and/or dyes, mold release agents, fillers, e.g., calcium carbonate, ultraviolet light absorbers, fire retardants and mixtures thereof. Additives may be present in the thermoplastic composition in functionally sufficient amounts, e.g., in amounts independently from 0.1 percent by weight to 10 percent by weight, based on the total weight of the thermoplastic composition.

In the method of the present invention, the heated thermoplastic sheet may be longitudinally and/or transversely stretched by lateral movement of the sheet retainers away from the perimeter edge of the first mold portion, while the heated thermoplastic sheet is between its glass transition temperature and below its melting temperature. During the stretching operations (e.g., $T_g < T_{(sheet)} < T_m$), the polymer molecules of the heated thermoplastic sheet, in the solid state, may become orientated in the stretching direction, thereby resulting in improved or increased physical properties (e.g., compressive strength) along the stretching direction. As such, the shaped thermoplastic sheet formed in accordance with the method of the present invention may exhibit uniaxial or biaxial orientation (relative to the polymer molecules). In addition, when the thermoplastic composition includes fibers, such as glass fibers, stretching of the heated thermoplastic sheet (e.g., under conditions of $T_g < T_{(sheet)} < T_m$), by lateral movement of the sheet retainers away from the mold perimeter edge, may also serve to orient the fibers uniaxilly or biaxially, thereby providing the shaped thermoplastic sheet with improved or increased physical properties along the stretching direction. Accordingly, the shaped thermoplastic sheet formed in accordance with the method of the present invention may alternatively or additionally exhibit uniaxial or biaxial fiber orientation.

In an embodiment of the method of the present invention, the heated thermoplastic sheet is a heated multilayer thermoplastic sheet having at least two thermoplastic layers, and accordingly the shaped thermoplastic sheet is a shaped multilayer thermoplastic sheet. Each thermoplastic layer may be formed from a separate thermoplastic composition, or the same thermoplastic composition. For example, each thermoplastic composition may be melt compounded so as to form separate molten thermoplastic compositions that are each separately fed into a multilayer sheet die, in accordance with art-recognized methods. The multilayer sheet die forms a heated multilayer thermoplastic sheet from the molten thermoplastic compositions fed therein.

Shaped thermoplastic sheets (or molded articles) that may be prepared in accordance with the method of the present invention may have complex 3-dimensional shapes, or relatively simple shapes, such as panels (e.g., wall panels, or wall panel covers). Molded articles that may be prepared according to the method of the present invention, include but are not limited to: fluid management structures, such as fluid/water management chambers, storm/waste water chambers, storm drains and culverts; storage structures; support structures or platforms (e.g., pallets); and shelters (e.g., shelters for domestic pets, such as dogs and cats).

For purposes of further illustration, the method and sheet molding apparatus of the present invention may be employed to fabricate/mold shaped articles, such as fluid management structures (e.g., fluid/water management chambers and storm/waste water chambers). Fluid management structures, such as storm/waste water chambers, are typically buried in a porous media, and more typically beneath the ground or earth (e.g., beneath soil, clay and/or aggregate materials), and serve to collect and divert fluid runoff (such as rain/waste water runoff), thus preventing or minimizing pooling of the runoff on and/or above the ground surface. Since fluid management structures, such as storm/waste water chambers, are typically buried beneath the ground (e.g., over which heavy motorized vehicles may travel), they must be structurally and dimensionally stable so as to resist collapse due to the weight of the overlaying ground and optional traffic.

Fluid management structures, such as storm water chambers fabricated using the method and apparatus of the present invention typically include a housing having a longitudinal axis, an arch shaped cross section, a first base side flange, a second base side flange, a plurality of raised lateral arch shaped ribs extending from the first base flange to the second base side flange, a plurality of continuous lateral arch shaped indentations extending from the first base flange to the second base flange, an open bottom, an exterior surface, and an interior surface. Each continuous lateral indentation is interposed between a pair of neighboring raised lateral ribs. The fluid management structure also typically includes a first endplate having an exterior surface and an interior surface, and a second endplate having an exterior surface and an interior surface. The fluid management structure may optionally be free of the first and/or second endplates. The housing, first endplate and second endplate together define a continuous unitary structure (i.e., a continuous unitary molded fluid management structure). The exterior surfaces of each of the housing, the first endplate and the second endplate are in each case defined by the first surface of the heated thermoplastic sheet (from which the fluid management structure is molded). The interior surfaces of each of the housing, the first endplate and the second endplate are in each case defined by the second surface of the heated thermoplastic sheet (from which the fluid management structure is molded). The interior surfaces of each of the housing, the first endplate and the second endplate together define an interior chamber of the fluid management structure.

The first endplate and the second endplate each independently have at least one opening that is in fluid communication with the interior chamber. The openings may be located anywhere in the endplates (e.g., in upper, middle and/or lower portions of the endplates). In an embodiment, the first endplate has a first opening that is in fluid communication with the interior chamber, and which has an open bottom that is continuous with the open bottom of the housing. In the same embodiment, the second endplate has a second opening that is in fluid communication with the interior chamber, and which has an open bottom that is continuous with the open bottom of the housing.

The method and sheet molding apparatus of the present invention provides control over the wall thicknesses of the various components of the shaped articles, such as fluid management structures, fabricated thereby. For example, the housing, first endplate and second endplate of the fluid management structure may each have wall thicknesses that are substantially equivalent, i.e., having a variation of wall thickness (a wall thickness variation value) of less than or equal to plus or minus 10 percent (e.g., a wall thickness in each case of 5.1 mm (0.2 inch) plus or minus 10 percent, that is a wall thickness in each case of from 4.59 mm to 5.61 mm), and preferably less than or equal to plus or minus 5 percent. Alternatively, the housing, first endplate and second endplate of the fluid management structure may each have different wall thicknesses (e.g., the housing having a wall thickness that is greater than that each of the first and second endplates, which may have substantially equivalent wall thicknesses).

Figure 16:
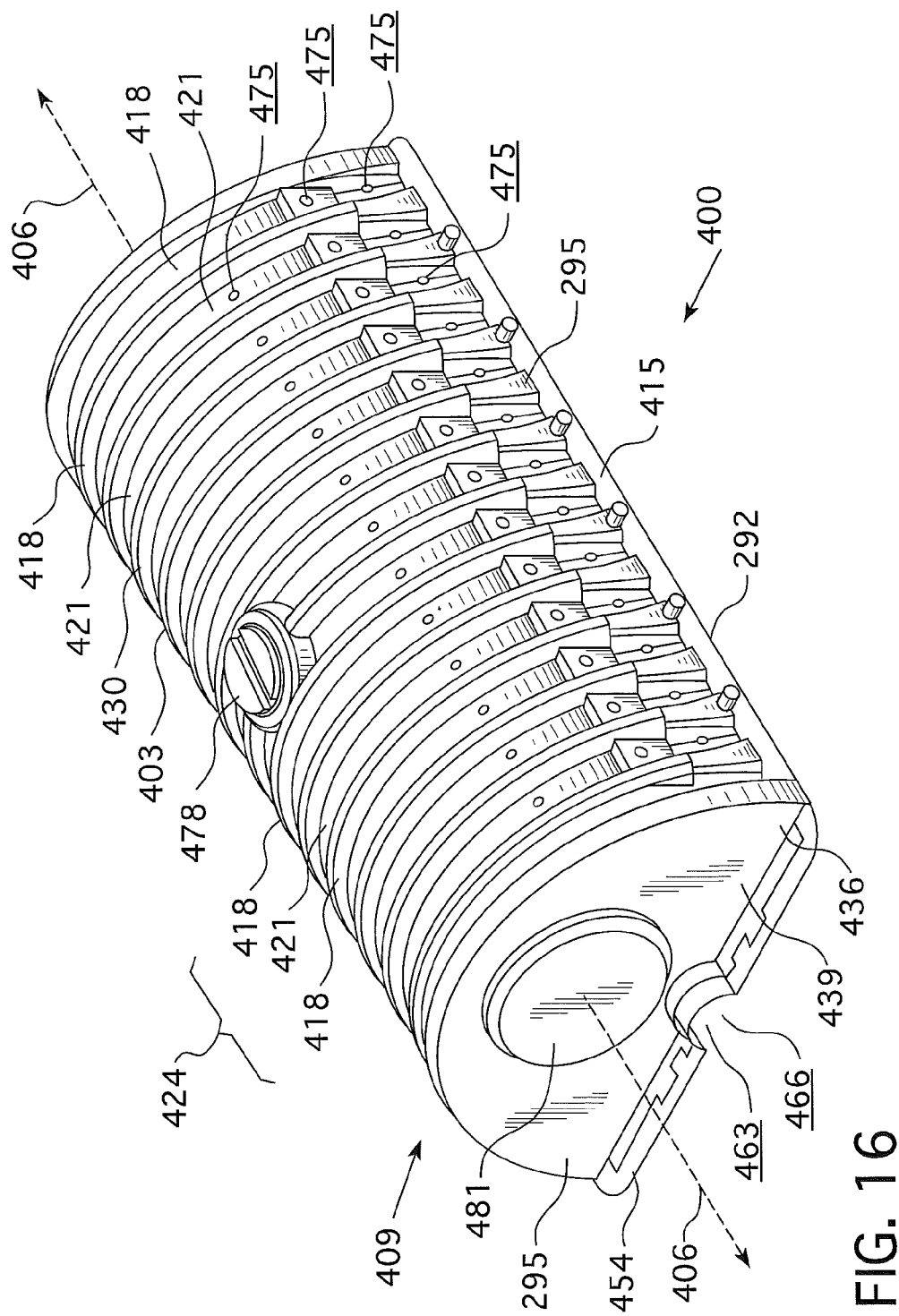
FIG. 16 is a representative perspective substantially isometric view of a fluid management structure prepared using the method of the present invention.
Figure 17:
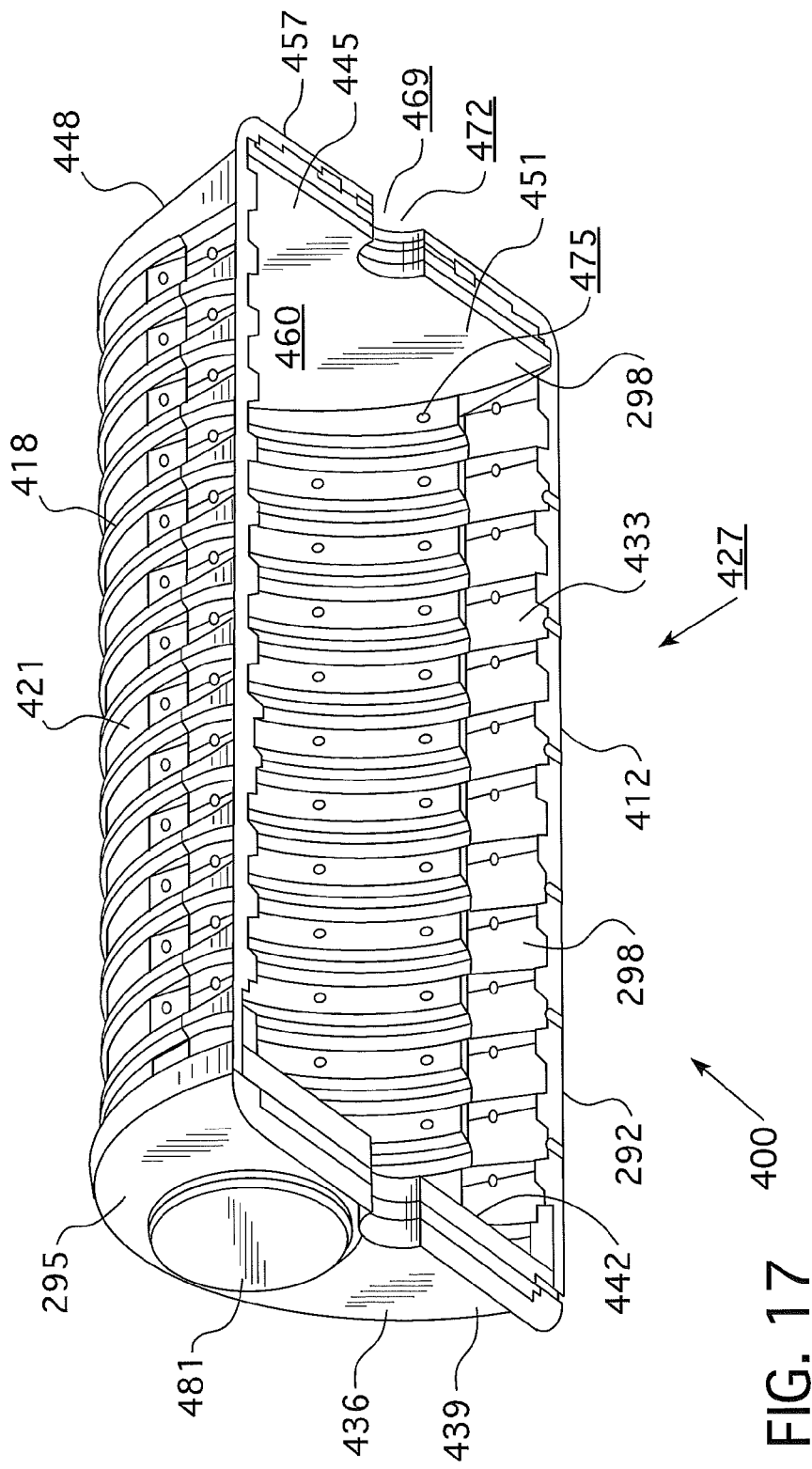
FIG. 17 is a representative perspective view of the underside of the fluid management structure of FIG. 16.

For purposes of further illustration, and with reference to FIGS. 16 and 17 there is depicted a fluid management structure 400 (e.g., a storm/waste water chamber 400) fabricated using the method and sheet molding apparatus of the present invention. In particular, fluid management structure 400 is fabricated from heated thermoplastic sheet 292, in accordance with the method and apparatus as described previously herein. Fluid management structure 400 has a housing (or body) 403 having a longitudinal axis 406. Housing 403 has an arched shaped geometrical cross section 409 taken perpendicular relative to longitudinal axis 406. Housing 403 further includes a first base side flange 412 and a second base side flange 415, each of which extend laterally outward from housing 403 and which are each substantially parallel with longitudinal axis 406, and accordingly are and form opposing first and second base side flanges (412 and 415). Housing 403 includes a plurality of raised substantially continuous lateral ribs 418 that extend from the first to the second base side flanges (412 to 415), and a plurality of continuous lateral indentations (or valleys) 421 that extend from the first to the second base side flanges (412 to 415). Each continuous lateral indentation 421 is interposed between a pair of neighboring raised lateral ribs 418 (e.g., neighboring pair of raised lateral ribs 424 of FIG. 16). Raised lateral ribs 418 and lateral indentations 421: are substantially parallel to each other; in each case conform to (or follow) the arched shape of housing 403; and in each case are oriented substantially perpendicular relative to longitudinal axis 406. Housing 403 also has an open bottom 427, an exterior surface 430 and an interior surface 433.

Fluid management structure 400 further includes: a first endplate 436 having an exterior surface 439 and an interior surface 442 (not visible in the drawings); and a second endplate 445 having an exterior surface 448 (not visible in the drawings) and an interior surface 451. Housing 403, first endplate 436 and second endplate 445 together define a substantially continuous unitary structure (i.e., a substantially continuous unitary fluid management structure 400). First endplate 436 may optionally have a first endplate base flange 454 extending laterally outward therefrom. Second endplate 445 may optionally have a second endplate base flange 457 extending laterally outward therefrom. First endplate base flange 454 and second endplate base flange 457 are each substantially continuous with each of first base side flange 412 and second based side flange 415 of housing 403.

In an embodiment, fluid management structure 400 is free of first endplate 436 and/or second endplate 445, in which case the first and/or second ends of structure 400 are open. When free of both first endplate 436 and second endplate 445, fluid management structure 400 consists of housing 403, and the first and second ends of structure 400 are each open.

Exterior surface 430 of housing 403, exterior surface 439 of first endplate 436 and exterior surface 448 of second endplate 445 are in each case defined by first surface 295 of thermoplastic sheet 292.

Interior surface 433 of housing 403, interior surface 442 of first endplate 436 and interior surface 451 of second endplate 445 are in each case defined by second surface 298 of thermoplastic sheet 292. See, for example, FIG. 17. In addition, interior surface 433 of housing 403, interior surface 442 of first endplate 436 and interior surface 451 of second endplate 445 together define an interior chamber 460 (FIG. 17) of fluid management structure 400.

First endplate 436 has a first opening 463 that is in fluid communication with interior chamber 460. First opening 463 of first endplate 436 has an open bottom 466 that is continuous with open bottom 427 of housing 403. Second endplate 445 has a second opening 469 that is in fluid communication with interior chamber 460. Second opening 469 of second endplate 445 has an open bottom 472 that is continuous with open bottom 427 of housing 403. First opening 463 and second opening 469 of the endplates allows a fluid, such as water, to pass into and out of interior chamber 460. In addition, first opening 463 and second opening 469 of the endplates allows a fluid, such as water, that collects within interior chamber 460 to flow out of the interior chamber. The first and/or second openings (463, 469) may be connected to the first and/or second opening of a neighboring fluid management structure (not shown) by suitable means, such as a conduit (not shown). Alternatively, one of the first or second openings (463, 469) may be capped, in particular when the fluid management structure is a terminal fluid management structure.

In addition or alternatively to having an opening (e.g., openings 463 and 469) having an open bottom (e.g., 466 and 472) the first and second endplates may each independently have an opening that is in fluid communication with interior chamber 460, but which does not have an open bottom (e.g., 466 or 472) that is continuous with open bottom 427 of housing 403. First endplate 436 includes an optional cap 481 that may be cutout so as to provide first endplate 436 with an opening (not shown) that is in fluid communication with interior chamber 460, but which does not have an open bottom that is continuous with open bottom 427. Second endplate 445 also has an optional cap (not visible in the drawings) that is similar to cap 481.

To provide for more efficient collection and/or emission of fluid, such as water, within and/or out-of fluid management structure 400, housing 403 may further include a plurality of apertures 475. Apertures 475 may reside within raised lateral ribs 418 and/or continuous lateral indentations 421. As depicted in the drawings, apertures 475 of housing 403 reside within continuous lateral indentations 421 (and raised lateral ribs 418 are free of apertures 475). Apertures 475 allow a fluid, such as water, to pass from the surrounding media in which the structure 400 is buried (e.g., ground) into and collect within interior chamber 460, from where the collected fluid may pass out through first endplate opening 463 and/or second endplate opening 469. Alternatively, or in addition thereto, apertures 475 allow a fluid, such as water, to pass from interior chamber 460 out into the surrounding media in which the structure 400 is buried (e.g., ground). In addition, a fluid, such as water, may pass up through open bottom 427 of housing 403 and into interior chamber 460, from where it may pass out through first endplate opening 463 and/or second endplate opening 469, and/or apertures 475. Apertures 475 may be formed during molding of fluid management structure 400 from the heated thermoplastic sheet 292, or they may be formed in a post-molding operation (e.g., by means of post-molding drilling and or punching operations).

The housing of the fluid management structure may be fabricated with additional molded-in features, such as an inspection portal structure. Housing 403 of fluid management structure 400 has an inspection portal structure 478 (located in the top or apex of housing 403). Inspection portal structure 478 provides a means of accessing and inspecting interior chamber 460 of housing 403 after fluid management structure 400 has been buried underground, without compromising the structural and/or dimensional integrity of the fluid management structure. For example, after burying the structure underground, a portion of the overlaying ground may be removed so as to expose inspection portal structure 478, which may be cut open (typically partially cut open and pulled up or back) to allow access to and visual inspection of interior chamber 460. After visual inspection of interior chamber 460 has been completed, inspection portal structure 478 may be sealed by suitable means (e.g., heat and/or radio frequency welding, and/or adhesives), and re-covered with ground material.

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a molded article comprising:
   (a) providing a mold apparatus comprising,
      (i) a first mold portion having an interior mold surface, and a perimeter edge, said interior mold surface having a contour and a plurality of perforations,
      (ii) a frame surrounding at least a portion of said perimeter edge of said first mold portion, said frame having an upper surface, said first mold portion and said frame being reversibly vertically positionable relative to each other, and
      (iii) at least one sheet retainer, each sheet retainer having a clamp portion facing towards said perimeter edge of said first mold portion and comprising a clamp member and a clamp interior, said clamp member being reversibly closeable, said clamp interior being defined in part by said clamp member, each sheet retainer being independently, reversibly and laterally attached to said upper surface of said frame such that said clamp portion of each sheet retainer is reversibly and laterally positionable relative to said perimeter edge;
   (b) positioning said first mold portion and said frame relative to each other such that the upper surface of said frame is located above said perimeter edge;
   (c) positioning said clamp member of each sheet retainer in an open position so as to provide access to said clamp interior;
   (d) forming, from at least one thermoplastic composition, a heated thermoplastic sheet having a temperature that allows said heated thermoplastic sheet to be thermoformable, said heated thermoplastic sheet having a first surface and a second surface;
   (e) contacting a first portion of said second surface of said heated thermoplastic sheet with the clamp interior of at least one sheet retainer;
   (f) positioning said clamp member of said sheet retainer in a closed position so as to clamp and retain said first portion of said heated thermoplastic sheet within said clamp interior;
   (g) positioning said first mold portion and said frame relative to each other so as to contact a second portion of the second surface of said heated thermoplastic sheet with at least a portion of the interior mold surface of said first mold portion;
   (h) moving laterally at least one sheet retainer to a lateral position selected from the group consisting of towards said perimeter edge, away from said perimeter edge, and combinations thereof,
      wherein lateral movement of said sheet retainer controls at least a portion of a thickness of said second portion of said heated thermoplastic sheet that is contacted with the interior mold surface of said first mold portion;
   (i) drawing reduced pressure through said plurality of perforations of said interior mold surface of said first mold portion, such that said second portion of said second surface of said heated thermoplastic sheet substantially matches said contour of said interior mold surface of said first mold portion;
   (j) cooling said heated thermoplastic sheet thereby forming a shaped thermoplastic sheet that retains said contour of said interior mold surface of said first mold portion; and
   (k) removing said shaped thermoplastic sheet from said first mold portion,
wherein said shaped thermoplastic sheet is said molded article.

2. The method of claim 1 wherein said first mold portion is substantially stationary relative to vertical positioning, and said frame is reversibly and controllably vertically positionable, and
   said frame is reversibly, controllably and vertically positioned relative to said first mold portion, thereby contacting said second portion of the second surface of said heated thermoplastic sheet with at least a portion of the interior mold surface of said first mold portion.

3. The method of claim 1 wherein said mold apparatus comprises at least two sheet retainers.

4. The method of claim 1 wherein said sheet retainer further comprises a base plate having an upper surface, a lower surface and a forward portion, said clamp member being hingedly attached to an upper surface of said forward portion of said base plate, said clamp member and said forward portion of said base plate together defining said clamp portion of said sheet retainer, the upper surface of said forward portion and an inner surface of said clamp member together defining said clamp interior, and at least a portion of said lower surface of said base plate slidingly abutting said upper surface of said frame.

5. The method of claim 4 wherein said sheet retainer further comprises a first linear actuator having a first end and a second end, said first linear actuator being reversibly linearly expandable, and said base plate further comprises a slot and a rear portion, said first end of said first linear actuator being located within said slot and being fixedly attached to the upper surface of said frame, said second end of said first linear actuator being fixedly attached to an upper surface of said rear portion of said base plate, and reversible linear expansion of said first linear actuator providing reversible lateral movement of said sheet retainer relative to said perimeter edge of said first mold portion.

6. The method of claim 5 wherein said sheet retainer further comprises a second linear actuator having a first end and a second end, said second linear actuator being reversibly linearly expandable, said first end of said second linear actuator being pivotally attached to an exterior surface of said clamp member, and said second end of said second linear actuator being attached to the upper surface of said rear portion of said base plate, and reversible linear expansion of said second linear actuator providing reversible closing of said clamp member.

7. The method of claim 4 wherein said base plate of said sheet retainer further comprises at least one enclosed passage which extends into said forward portion of base plate, said enclosed passage being dimensioned for passage of a heat exchange fluid therethrough, and said enclosed passage thereby providing temperature control to at least a portion of said clamp portion of said sheet retainer.

8. The method of claim 1 wherein said heated thermoplastic sheet has an interior portion interposed between said first surface and said second surface of said heated thermoplastic sheet, said temperature of said heated thermoplastic sheet is substantially uniform through said first surface, said interior portion and said second surface of said heated thermoplastic sheet, when said first portion of said second surface of said heated thermoplastic sheet is contacted with the clamp interior of at least one sheet retainer, and when said second portion of said second surface of said heated thermoplastic sheet is drawn against the interior mold surface of said first mold portion.

9. The method of claim 1 further comprising, melting said thermoplastic composition in an extruder thereby forming a molten thermoplastic composition, said extruder having a terminal end that is in fluid communication with a sheet die, and passing said molten thermoplastic composition through said sheet die, thereby forming said heated thermoplastic sheet.

10. The method of claim 9 wherein the step of contacting said first portion of said second surface of said heated thermoplastic sheet with the clamp interior of said sheet retainer occurs prior to necking of said heated thermoplastic sheet, and further wherein, retention of said first portion of said second surface of said heated thermoplastic sheet within said clamp interior of said sheet retainer substantially prevents necking of said heated thermoplastic sheet.

11. The method of claim 9 wherein said first mold portion and said frame are together moveable in a plane beneath said sheet die, and said sheet die is substantially stationary, said method further comprising moving said first mold portion and said frame together in said plane beneath said sheet die as said thermoplastic sheet is formed, thereby facilitating contact between said heated thermoplastic sheet and said clamp interior of said sheet retainer.

12. The method of claim 9 further comprising detaching said heated thermoplastic sheet from said sheet die one of prior to, concurrently with and after the step of, (g) positioning said first mold portion and said frame relative to each other so as to contact said second portion of the second surface of said heated thermoplastic sheet with at least a portion of the interior mold surface of said first mold portion.

13. The method of claim 1 wherein said mold apparatus further comprises a second mold portion having an interior mold surface, said method further comprising contacting compressively said interior mold surface of said second mold portion with said first surface of said heated thermoplastic sheet, after said second portion of said second surface of said heated thermoplastic sheet has been drawn into contact with the interior mold surface of said first mold portion, and before cooling of said heated thermoplastic sheet.

14. The method of claim 1 wherein the step of, (h) moving laterally at least one sheet retainer to said lateral position, is performed at least one of prior to, substantially concurrently with and after the step of, (g) positioning said first mold portion and said frame relative to each other so as to contact said second portion of the second surface of said heated thermoplastic sheet with at least a portion of the interior mold surface of said first mold portion.

15. The method of claim 1 wherein the step of, (h) moving laterally at least one sheet retainer to said lateral position, is performed substantially concurrently with the step of, (g) positioning said first mold portion and said frame relative to each other so as to contact said second portion of the second surface of said heated thermoplastic sheet with at least a portion of the interior mold surface of said first mold portion.

16. The method of claim 1 wherein the step of, (i) drawing reduced pressure through said plurality of perforations of said interior mold surface of said first mold portion, such that said second portion of said second surface of said heated thermoplastic sheet substantially matches said contour of said interior mold surface of said first mold portion, is performed one of concurrently with and sequentially after the step of, (h) moving laterally at least one sheet retainer to said lateral position.

17. The method of claim 1 further comprising, contacting a third portion of said second surface of said heated thermoplastic sheet with said perimeter edge of said first mold portion, thereby forming a seal between said third portion of said second surface of said heated thermoplastic sheet and said perimeter edge, and then subsequently performing the step of, (i) drawing reduced pressure through said plurality of perforations of said interior mold surface of said first mold portion, such that said second portion of said second surface of said heated thermoplastic sheet substantially matches said contour of said interior mold surface of said first mold portion.

18. The method of claim 1 further comprising, providing a continuous film strip having a first surface and a second surface, said second surface of said continuous film strip being defined by a thermoplastic film layer, applying continuously said second surface of said continuous film strip to a portion of said first surface of said heated thermoplastic sheet as said heated thermoplastic sheet is formed, wherein said second surface of said continuous film strip and said portion of said first surface of said heated thermoplastic sheet being fused together, wherein said second surface of said continuous film strip is applied to said first surface of said heated thermoplastic sheet as said heated thermoplastic sheet is formed and prior to the step of (g) positioning said first mold portion and said frame relative to each other so as to contact said second portion of the second surface of said heated thermoplastic sheet with at least a portion of the interior mold surface of said first mold portion.

19. The method of claim 1 wherein each thermoplastic composition comprises a thermoplastic material selected independently from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof.

20. The method of claim 1 wherein each thermoplastic composition comprises a reinforcing material selected independently from the group consisting of glass fibers, glass beads, carbon fibers, metal flakes, metal fibers, polyamide fibers, cellulosic fibers, nanoparticulate clays, talc and mixtures thereof.

21. The method of claim 20 wherein said reinforcing material is selected from glass fibers having a length of 1.27 cm to 10.16 cm.

22. The method of claim 1 wherein said heated thermoplastic sheet is a heated multilayer thermoplastic sheet comprising at least two thermoplastic layers.

* * * * *